(12) United States Patent
Abd Ellatif

(10) Patent No.: US 9,090,491 B2
(45) Date of Patent: Jul. 28, 2015

(54) REMOVAL OF BORON FROM SALINE WATER USING ALKALIZED NF MEMBRANE PRETREATMENT

(75) Inventor: Abou Elfetouh Zaki Abd Ellatif, Elminia (EG)

(73) Assignee: SALINE WATER DESALINATION RESEARCH INSTITUTE, Al-Jubail (SA)

( * ) Notice: Subject to any disclaimer, the term of this patent is extended or adjusted under 35 U.S.C. 154(b) by 0 days.

(21) Appl. No.: 14/342,371

(22) PCT Filed: Feb. 2, 2012

(86) PCT No.: PCT/US2012/023594
§ 371 (c)(1),
(2), (4) Date: Feb. 28, 2014

(87) PCT Pub. No.: WO2013/032528
PCT Pub. Date: Mar. 7, 2013

(65) Prior Publication Data
US 2014/0224734 A1  Aug. 14, 2014

Related U.S. Application Data

(63) Continuation-in-part of application No. 13/225,389, filed on Sep. 2, 2011.

(51) Int. Cl.
*B01D 61/04* (2006.01)
*C02F 1/44* (2006.01)
(Continued)

(52) U.S. Cl.
CPC .............. *C02F 1/442* (2013.01); *B01D 61/022* (2013.01); *B01D 61/027* (2013.01); *B01D 61/04* (2013.01);
(Continued)

(58) Field of Classification Search
CPC ............ C02F 1/44; C02F 1/441; C02F 1/442; C02F 1/66; C02F 2101/108; C02F 2103/08; C02F 2209/06; C02F 2301/08; B01D 61/04; B01D 61/022; B01D 61/025; B01D 61/027; B01D 2311/04; B01D 2311/18; B01D 2317/025
USPC ................. 210/637, 639, 641, 650, 651, 652, 210/747.5, 806, 808
See application file for complete search history.

(56) References Cited

U.S. PATENT DOCUMENTS 5,766,479 A * 6/1998 Collentro et al. ............. 210/639
6,379,518 B1    4/2002 Osawa et al.
(Continued)

FOREIGN PATENT DOCUMENTS

EP           1614660 A1    1/2006
WO    WO 2007/007343 A2   1/2007
(Continued)

OTHER PUBLICATIONS

"Optimum nanofiltration membrane arrangements in seawater pretreatment—Part I," A. Abdullatef, M Farooque, G. Al-Otaibi, M. Kither, S. Al Khamis Desalination and Water Treatment, Apr. 2011, pp. 270-286.
(Continued)

*Primary Examiner* — Joseph Drodge
(74) *Attorney, Agent, or Firm* — Richard C Litman

(57) ABSTRACT

The removal of boron from saline water based (10) using alkalized NF membrane pretreatment (14) can be adopted at 90% recovery and pH 8-9.5 to produce softened and alkalized NF permeate having SDI<1 with significant reduction in feed boron, TDS and scale-forming ions depending on the properties of the NF membrane polymer structure. NF process (14) acts as a partial desalination process, a softening process, as well as a boron removal process. An additional RO membrane alkalization (16) can be adopted at a wide range of RO feed at pH 8.5-10, resulting in production of desalinated water (18) with almost nil boron content.

8 Claims, 18 Drawing Sheets

(51) Int. Cl.
    *B01D 61/02*     (2006.01)
    *C02F 1/66*          (2006.01)
    *C02F 101/10*        (2006.01)
    *C02F 103/08*        (2006.01)
    *C02F 1/00*          (2006.01)
    *C02F 1/52*          (2006.01)
    *C02F 5/00*          (2006.01)

(52) U.S. Cl.
    CPC ........... *B01D 61/025* (2013.01); *B01D 2311/04* (2013.01); *B01D 2311/18* (2013.01); *B01D 2317/025* (2013.01); *C02F 1/004* (2013.01); *C02F 1/441* (2013.01); *C02F 1/5245* (2013.01); *C02F 1/66* (2013.01); *C02F 5/00* (2013.01); *C02F 2101/108* (2013.01); *C02F 2103/08* (2013.01); *C02F 2209/06* (2013.01); *C02F 2301/043* (2013.01); *C02F 2301/08* (2013.01)

(56) References Cited

U.S. PATENT DOCUMENTS

| | | | |
|---|---|---|---|
| 6,508,936 | B1 | 1/2003 | Hassan |
| 6,998,053 | B2 | 2/2006 | Awerbuch |
| 7,144,511 | B2 | 12/2006 | Vuong |
| 7,264,737 | B2 | 9/2007 | Godec et al. |
| 7,501,065 | B1 | 3/2009 | Bader |
| 7,744,760 | B2 | 6/2010 | Wilkins et al. |
| 2002/0125191 | A1 | 9/2002 | Mukhopadhyay |
| 2008/0067125 | A1 | 3/2008 | Wilkins et al. |
| 2009/0001009 | A1 | 1/2009 | Linder et al. |
| 2009/0223897 | A1 | 9/2009 | Villeneuve |
| 2010/0062156 | A1 | 3/2010 | Kurth et al. |
| 2010/0163471 | A1 | 7/2010 | Elyanow et al. |
| 2012/0160753 | A1 | 6/2012 | Vora et al. |
| 2012/0267307 | A1* | 10/2012 | McGinnis ............ 210/638 |
| 2013/0020259 | A1* | 1/2013 | Wallace ............ 210/639 |

FOREIGN PATENT DOCUMENTS

| | | |
|---|---|---|
| WO | WO 2010/059637 A1 | 5/2010 |
| WO | WO 2010/095139 A1 | 8/2010 |

OTHER PUBLICATIONS

"Significant improvements in NF seawater pretreatment up to 90% recovery with 40% reduction in operational and capital costs," WSTA Gulf Water Conference, Abou-Elfetouh Z.A., A. Mohammad F. Ghazzai F.A., N.M. Kither, Mar. 2010, Sultanate of Oman 10-014.

\* cited by examiner

REMOVAL OF BORON FROM SALINE WATER USING ALKALIZED NF MEMBRANE PRETREATMENT

TECHNICAL FIELD

The present invention relates to water desalination systems and methods, and particularly to systems and methods for the removal of boron from saline water using alkalized nanofiltration (NF) membrane pretreatment in a cost-effective manner.

BACKGROUND ART

Water is a basic necessity for supporting life on this planet. Some regions of the world are fortunate to have adequate or abundant sources of fresh water due to a combination of moisture-rich, regional climate and the available natural resources, such as lakes and rivers. Other regions, such as the Middle East, are not so fortunate. Lack of abundant annual rains and the arid climate make fresh water a precious commodity.

Ironically, more than half the earth is covered by water, but that is in the form of seawater (SW), which is harmful to land-based life and plants if used in its natural state due to its high salinity. To capitalize on this abundant resource, desalination plants and systems process SW, as well as brackish water (BW) having a low salinity compared to seawater, into a safer, consumable form.

In recent years, boron in drinking and irrigation waters has become an important issue. Boron naturally exists in SW at concentrations of about 4 to 6 mg/L, with a maximum of about 7 mg/L in some waters. Toxicological effects of human exposure to excess boron, potentially from the consumption of water produced by desalination, have been reported. Boron is also an essential trace element for plant and crop growth and is contained in fertilizer. However, boron has been linked to detrimental effects on some plants and crops. This impacts the use of desalinated water for irrigation, where boron levels above 0.3 mg/L can potentially lead to foliage damage and reduction of fruit yield of some sensitive fruits, such as citrus and kiwis. As a consequence, the World Health Organization (WHO) recommends a guideline of 0.5 mg/L of boron in drinking water. The European Union (EU) has also classified boron as a pollutant of drinking water (EU Council Directive 98/83/Ec: 1 mg/L) if the boron concentration is at least 1 mg/L. At the end of 2008, WHO proposed to regulate boron concentration to be below 2.4 mg/L. However, the required boron concentration value in product water of each desalination plant depends on the system design of the plant, the usage of water, and the policy of the country.

In order to comply with the regulations and recommendations noted above, most desalination plants strive for the lowest concentration of boron to meet agricultural demands because if the desalinated product water is safe for irrigation, it will naturally be safe for human consumption. However, current conventional systems cannot reach this goal without incurring prohibitive costs in additional equipment and operational expenses.

For example, it is noted that boron in aqueous solutions exists as boric acid, $B(OH)_3$, and or borate anion, $B(OH)_4^-$, based on the pH of the solution. It is well known that boron compounds in seawater do not dissociate to ions at low or natural pH. At lower seawater pH, the major species is boric acid in molecular form. Due to the smaller size and the absence of ionic charge in the molecular form of boric acid, this results in lower membrane rejection. At higher seawater pH, membrane rejection increases strongly due to a shift to the charged form $B(OH)_4^-$, i.e., $B(OH)_4^-$ has a larger molecular size and a negative charge. Unfortunately, increasing seawater pH can lead to increasing the potential precipitation of large amounts of alkaline scale deposits. In the case of boron rejection by conventional RO (reverse osmosis) membranes, the rejection is affected by pH, permeate flux, temperature and salt concentration. The boron rejection of current RO membranes at nominal test conditions is about 85-90%. This corresponds to about 78-80% boron rejection with permeate boron concentration range of 0.8 to 1.3 mg/L in the operation of commercial SWRO (seawater reverse osmosis) systems. Thus, the extremely low boron concentration of ≤0.4 mg/L as per the above regulations cannot be achieved by a single pass RO operation.

Some alternative options include SWRO followed by a three-stage BWRO (brackish water reverse osmosis) with pH change, SWRO followed by boron selective ion exchange resin (BSR), and SWRO followed by a hybrid process of BSR and BWRO. All the above-mentioned techniques require additional capital and operational costs compared to the single-pass RO.

Another option attempts to optimize a single-pass RO process at feed pH of 9.5-10 to reject boron at higher levels and comply with regulations. This requires introducing new antiscalants to control alkaline scales due to seawater having a high scaling potential. In addition, it is expected that this type of process requires a higher caustic consumption rate, e.g., around 100 mg/L at seawater feed pH≤10, due to the high calcium bicarbonate concentration in seawater. However, no such antiscalants are known to the inventor.

In light of the above, it would be a benefit in the art of desalination to provide a system and/or method for removing boron to extremely low levels with minimal economic impact. Thus, the removal of boron from saline water using alkalized NF membrane pretreatment solving the aforementioned problems is desired.

DISCLOSURE OF THE INVENTION

The removal of boron from saline water using alkalized NF membrane pretreatment can be adopted at 90% recovery and pH 8-9.5 to produce softened and alkalized NF permeate having SDI<1 with significant reduction in feed boron, TDS (total dissolved solids), and scale-forming ions, depending on the properties of the NF membrane polymer structure. The NF process acts as a softening process, a partial desalination process, and a boron removal process. An additional RO membrane alkalization can be adopted at a wide range of RO feed at pH 8.5-10, resulting in the production of desalinated water with almost nil boron content.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

Figure 1A:
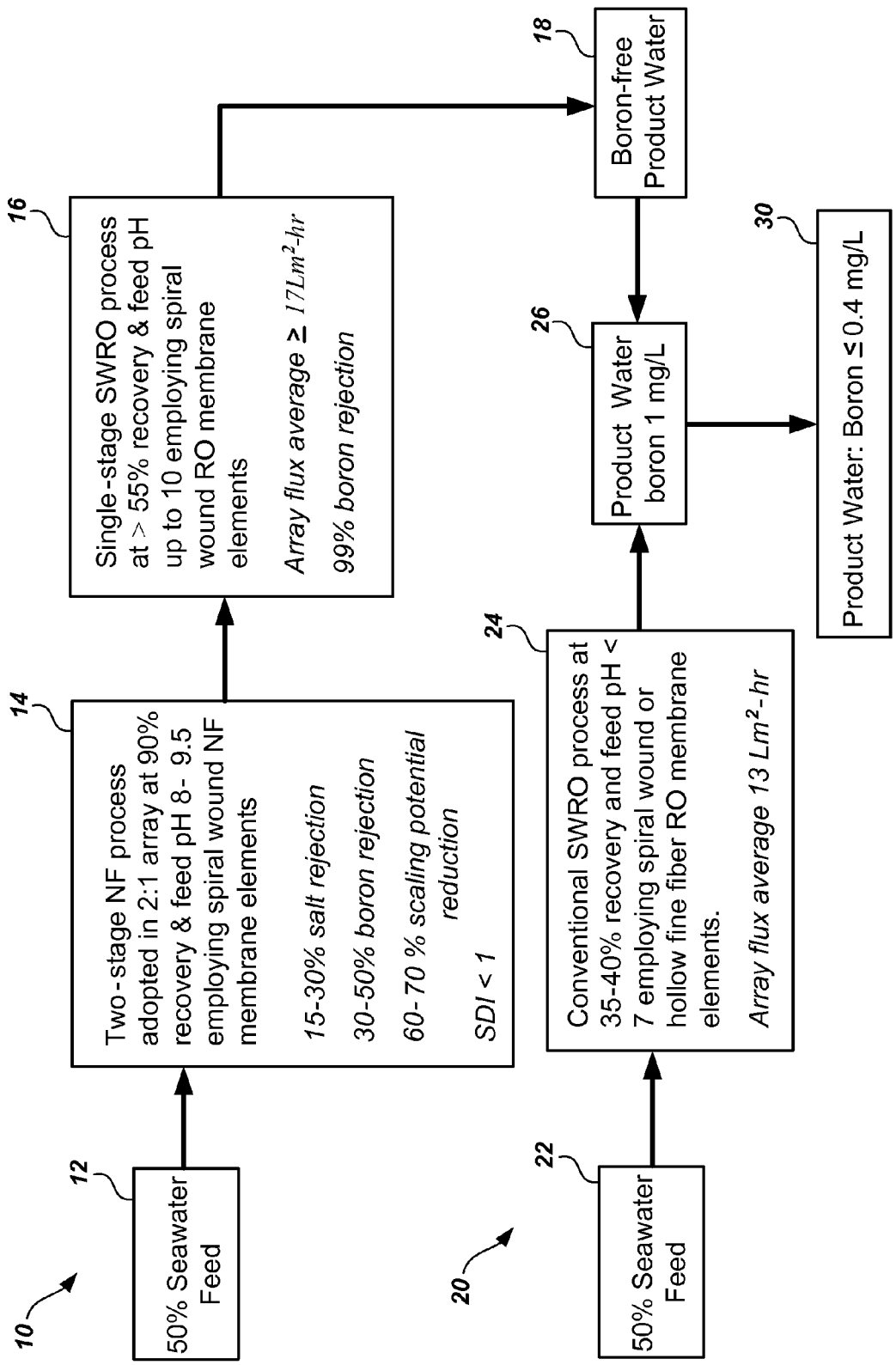
FIG. 1A is a block diagram comparing alternative embodiments of the process for removing boron from saline water using alkalized NF membrane pretreatment according to the present invention, in particular, from seawater.

Initially, it is to be understood that the phrase "saline water" as used herein refers to any water having a chemical salt content in various concentrations. Some examples include, but are not limited to, brackish water (BW), e.g., saline water of low salinity, and seawater (SW), e.g., saline water of high salinity. In addition, the phrase "boron-free" as used herein refers to water having less than or equal to about 3 mg/L, more preferably at least 0.4 mg/L or less.

The removal of boron from saline water using alkalized NF membrane pretreatment can reduce boron concentration to almost nil without incurring additional costs while facilitating operation of SWRO (seawater reverse osmosis) at higher recovery and flux rate with reduced chemical consumption. At the pretreatment stage, the NF membrane significantly reduces fouling and scaling potential of seawater feed, as well as lowering both feed TDS (total dissolved solids) and boron. At the RO stage, the SWRO process can be operated at higher recovery, flux rate, and also at higher RO feed pH (up to pH 10) in order to meet the above stringent boron requirements with reduced caustic consumption due to the low scaling potential of the NF permeate or product compared to seawater. This results in producing nearly boron-free desalinated water with reduced capital and operational costs. It has been found that the combination of NF pretreatment of alkaline seawater feed and subsequent SWRO can reduce boron to 0.1-0.15 mg/L at a RO feed of pH 9.4. Also, increasing RO feed pH up to 9.5 can easily produce nearly boron-free desalinated water. Moreover, the produced RO permeate of approximately zero boron concentration can be blended with product water of high boron concentration to reach the recommended level of ≤0.4 mg/L with minimal or no costs. Such results of high boron rejection and low economic impact cannot be obtained with seawater feed in a conventional desalination process. The conventional desalination process or system employs a second RO pass to remove boron to a level of 0.4 mg/L. The additional costs for this were estimated to be about 0.05-0.07 $/m$^3$ in a large system and 0.07-0.10 $/m$^3$ in a small system. Moreover, a second RO pass has limited efficiency and cannot meet many challenges, such as high feed temperature, high levels of feed boron, unexpected deterioration of the membrane boron rejection, and high flux rate and recovery without incurring prohibitive additional costs. It is known in industry that even increasing feed temperature by 1° C. has to be considered in drawing a contract and the economics and technology involved. In contrast, NF membrane alkalization can be implemented in a single SWRO desalination instead of a second RO pass for severe boron regulation with several benefits in facilities and system operation and costs.

Furthermore, NF membrane alkalization can be optimized to remove boron from low salinity feeds in two different operation modes, with or without a BWRO (brackish water reverse osmosis) process, to produce nearly boron-free water as required or desired. The process design parameters depend mainly on feed TDS, feed chemistry, feed boron and the desired boron concentration in the final product. Moreover, this process can be applied to water reclamation processes as well as to provide boron-free or low boron concentration water for industrial applications, such as pharmaceuticals, specialty foods, and electronic industries. The process is useful in removing boron from agriculture water, industrial waters, wastewater and oilfield product water, etc.

Oilfield-produced water is one industrial wastewater that may be produced in large quantities. Oilfield-produced water usually contains solubilized oil, considerable amounts of calcium and magnesium ions, and sometimes boron concentration ranging from 20-50 mg/L. To use oilfield-produced water for agriculture purposes, a multi-step method is being used to remove boron. This method comprises adding a water softener or passing the liquid through a water softening bed to remove divalent ions, followed by a RO membrane process at high pH operation. In this method, the BWRO process operated at 75% recovery, and the corresponding boron concentration was about 0.75-2 mg/L.

Instead of the above conventional softening process for such low salinity feed waters having divalent ions and higher levels of feed boron, an NF membrane pretreatment alkalization can greatly increase the efficiency and rejection of boron. NF membrane alkalization acts as a softening process, as well as a boron removal process, resulting in producing softened and alkalized NF product with lower feed boron concentration and SDI values. Consequently, a very efficient RO membrane alkalization can be optimized up to nearly zero level boron concentration if required while improving overall product recovery up to 90%. instead of 75%, and with reduced costs.

FIG. 1A shows an embodiment of the process used to obtain extremely low levels of boron from seawater feed, this process is generally being referred to by reference number 10. As shown, half of a given amount of seawater feed 12 is fed through a two-stage alkalized, pretreatment NF process 14 where the NF membrane elements are arranged in a 2:1 array at 90% recovery and feed pH ranging from 8-9.5. The NF membranes employed are of spiral wound configuration with a wide range of salt rejection, where NF membrane selection is based on the required NF process design parameters. This alkalized NF pretreatment stage 14 exhibited 15-30% salt rejection, 30-50% boron rejection, and 60-70% scaling reduction with a SDI<1. The NF permeate or product, which is now characterized by a low scaling potential compared to the original seawater feed, is then fed through an SWRO process 16. The SWRO process 16 includes a single stage SWRO operating at >55% recovery and feed pH up to 10, employing spiral wound RO membrane elements. The array flux at this stage averaged ≥17 Lm$^2$/hr at 99% boron rejection. This resulted in a product water 18 almost free of boron. As exemplarily shown, the alkalized NF membrane pretreatment alone with the SWRO process can produce water with extremely low boron content up to nearly zero level. Moreover, operation at such higher flux rate leads to increasing product recovery while reducing the number of pressure vessels and membranes.

As an alternative, where such low levels of boron are not required or desired, the product water 18 can be combined with the product water of a conventional SWRO process to obtain product water with boron levels at or below the recommended levels mentioned above. As shown in FIG. 1A, the alternative process 20 included the remaining half of the seawater feed 22 being fed to a conventional SWRO process 24. In this embodiment, the SWRO process 24 operated at 35-40% recovery with a feed pH<7 employing spiral wound or hollow fine fiber RO membrane elements. The array flux at this stage averaged 13 Lm$^2$/hr. The product water 26 of this process had a boron content of about 1 mg/L. Although 1 mg/L is above the recommended level, the product water 26 can be combined with the product water 18 to yield an aggregate product water 30 having ≤0.4 mg/L of boron. As exemplarily shown, the alkalized NF membrane pretreatment allows versatile configurations that can still yield such extremely low levels of boron.

Figure 1B:
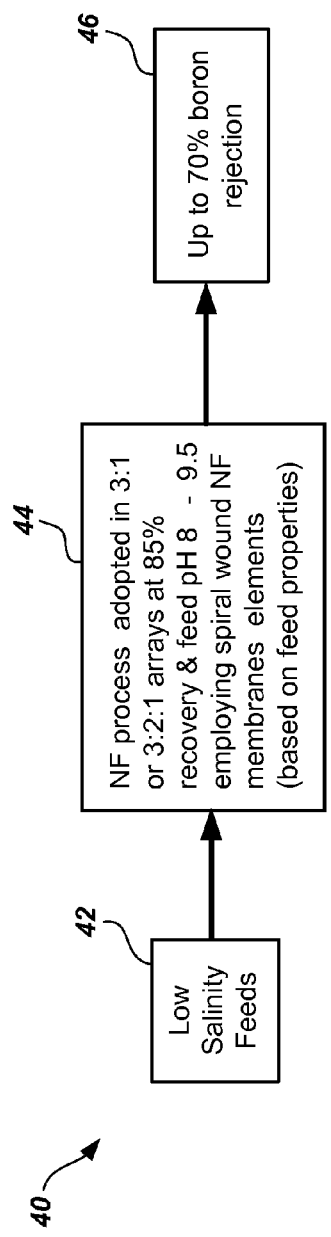
FIG. 1B is a block diagram of an embodiment of the process for removing boron from saline water (in particular, from brackish water) using alkalized NF membrane pretreatment according to the present invention.
Figure 1C:
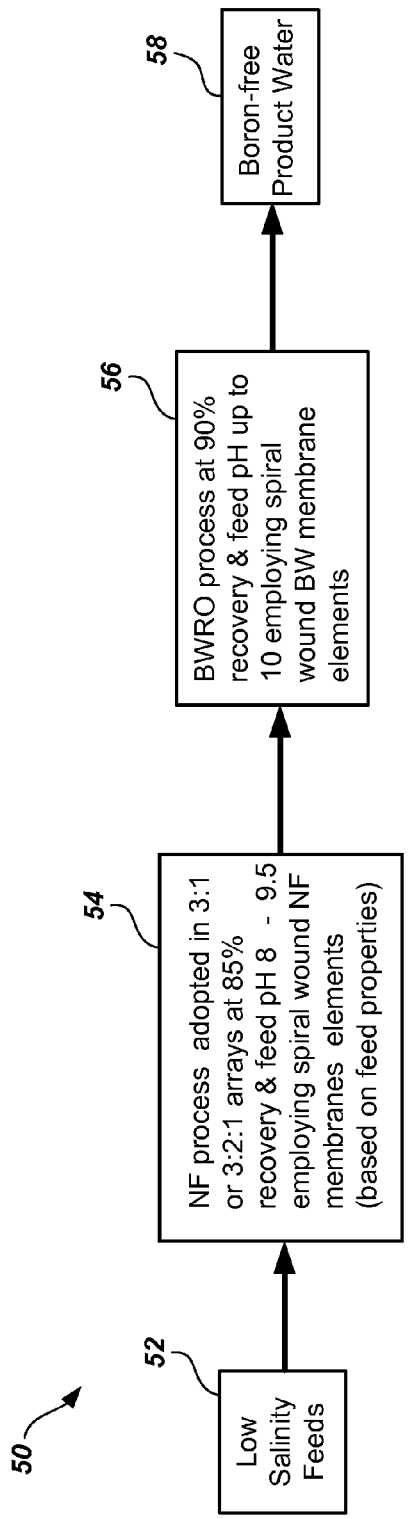
FIG. 1C is a schematic diagram of an embodiment of the process for removing boron from saline water (in particular, from brackish water) using alkalized NF membrane pretreatment according to the present invention with further BWRO (brackish water reverse osmosis) process.

The above processes describe utilizing the alkalized NF membrane pretreatment for high salinity feed. FIGS. 1B and 1C show two examples employing this process to a low salinity feed, or BW (brackish water). In the first 40 of these two examples, the low salinity feed 42 is fed to an NF process 44. Due to the relatively low scaling potential in the low salinity feed 42, the NF process 44 can be used alone to yield high results. In this embodiment, the NF process 44 utilized NF membrane elements arranged in a 2:1, 3:1 or 3:2:1 array operating at 85% recovery and feed pH 8-9.5 employing spiral wound NF membrane configuration with a wide range of salt rejection, the NF membrane selection being based on feed water properties and NF process design parameters. This yielded a product 46 having up to 70% boron rejection or more.

The second example 50 describes a process where the low salinity feed 52 can be further refined to yield a product with even lower boron content. As shown, the low salinity feed 52 is fed to an NF process 54 configured in the same manner above. The NF permeate or product is then fed to a BWRO process 56 operating at 90% recovery and feed pH up to 10 employing spiral wound BW membrane elements. This yielded product water 58 almost free of boron.

The following example describes the experiments conducted utilizing the NF membrane pretreatment.

Example

Experimental work included four essential trials. The first trial evaluated and compared the performances of three different NF membranes on removal of boron from seawater at different feed pH. The second trial optimized NF membrane seawater pretreatment process at different recovery ratios and feed pH for about 4,536 hours. The main purpose was to investigate the optimal operating conditions for NF pretreatment alkalization. The third trial lasted for about 2,200 operating hours to investigate the performance of NF-SWRO configuration with NF membrane alkalization. The fourth trial evaluated the performance of an NF-SWRO configuration with alkalization of both NF/RO membranes to produce nearly boron free desalinated water. This trial is on-going, but the results of about 1,600 operating hours are presented herein.

Figure 2:
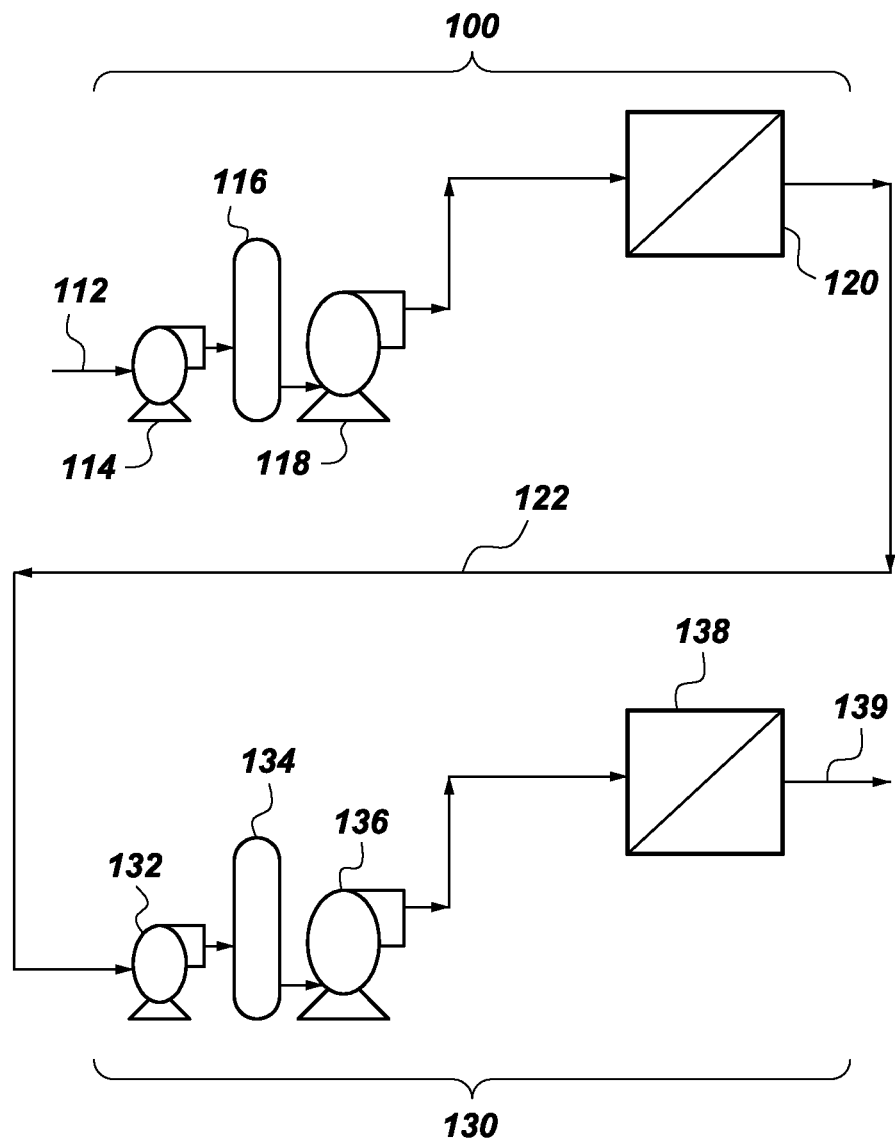
FIG. 2 is a schematic diagram of an experimental desalination plant implementing alkalized NF membrane pretreatment for the removal of boron according to the present invention.
Figure 3A:
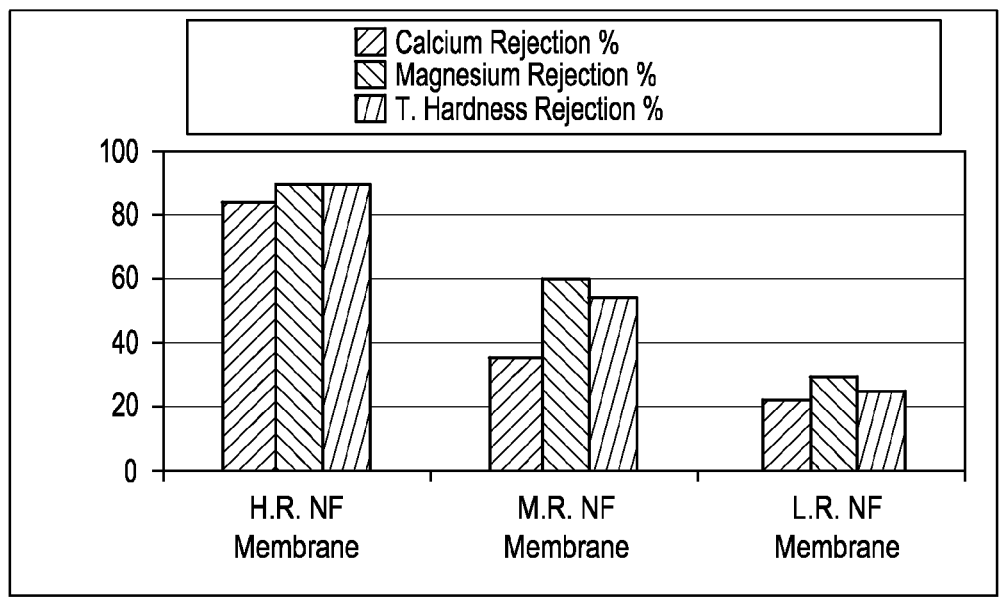
FIGS. 3A, 3B, 3C, and 3D are histograms showing the performance characteristics of three different exemplary NF membranes in terms of salt rejection, feed pressure and seawater ions rejection.
Figure 3B:
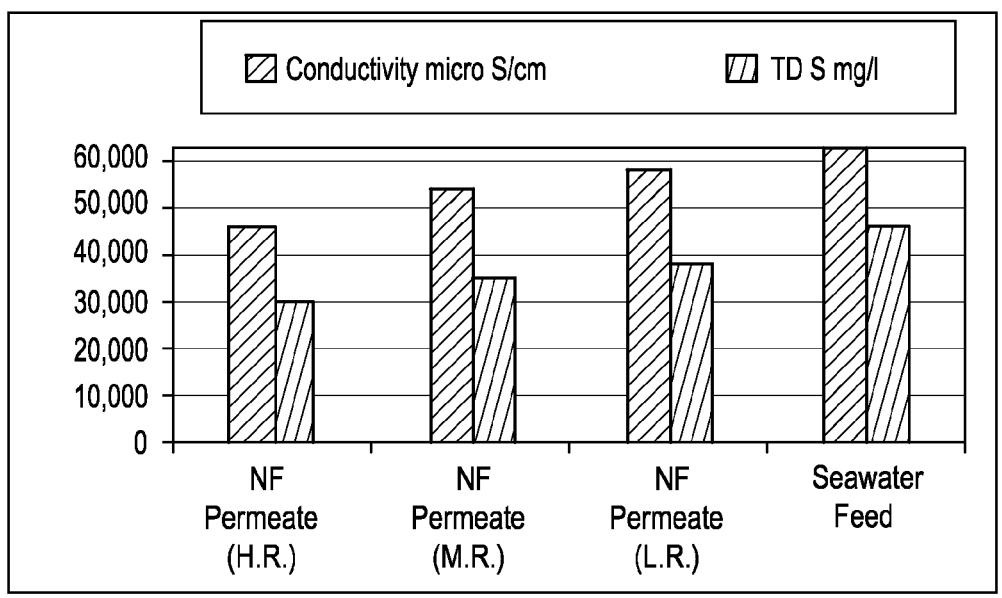
Figure 3C:
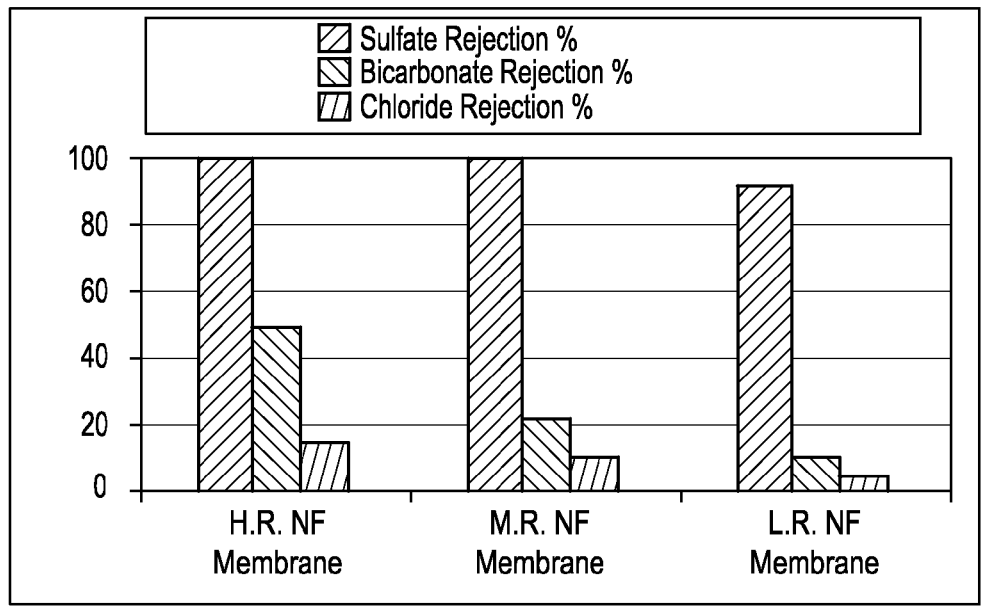
Figure 3D:
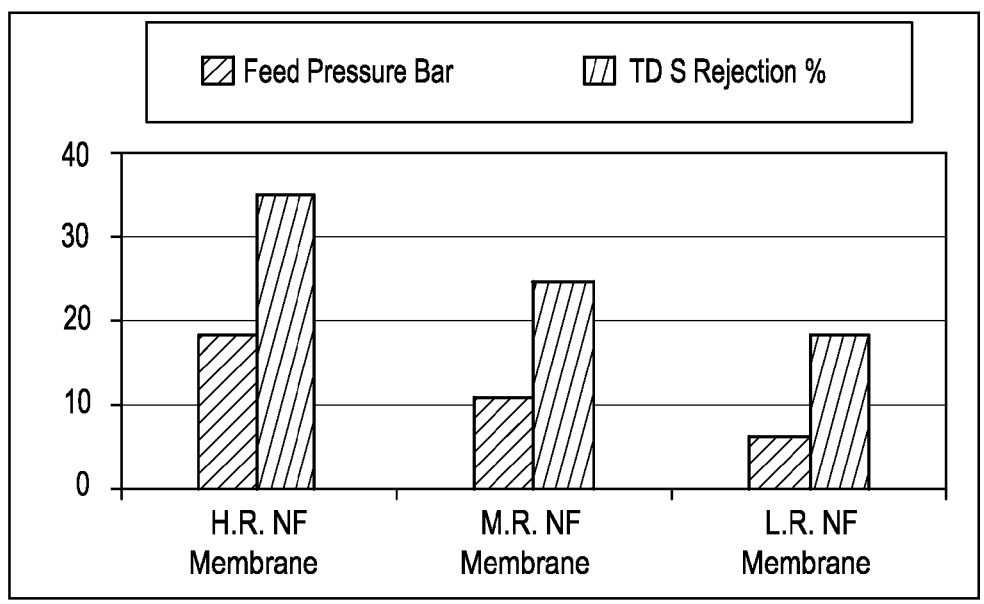

Initially, experimental processing plants were configured in the manner shown in FIG. 2. The seawater supply 112 was fed from a non-chlorinated seawater intake. An initial treatment of the seawater included a dual media filter followed by fine sand filter with a capacity of 15 m$^3$/hr. Ferric chloride was dosed as coagulant at a concentration of 0.6 ppm as $Fe^{+3}$. The pretreated seawater SDI values were maintained between 3-3.7. Also, three chemical dosing systems were used for antiscalant, NaOH and sulfuric acid.

As schematically shown in FIG. 2, the experimental desalination system incorporating alkalized NF membrane pretreatment includes a first stage 100 where the alkalized NF membrane pretreatment occurs. The first stage 100 includes a first booster pump 114 feeding seawater supply 12 towards an NF membrane assembly 120 at a predetermined flow rate and pressure. The seawater from the first booster pump 114 passes through a first cartridge filter 116 for initial filtration. Then an in-line first high pressure pump 118 feeds the filtered seawater through the NF membrane assembly 120 at another predetermined flow rate and pressure. Throughout this stage, chemical dosing systems can be provided to control scaling, pH, SDI value, and Fe content.

The permeate 122 from the NF membrane assembly 120 is then passed to a second stage 130 for SWRO processing. The SWRO processing can be constructed similarly as the first stage with a second booster pump 132 feeding the NF permeate 122 towards an RO membrane assembly 138, a second cartridge filter 134, and a second high pressure pump 136 feeding the filtered NF permeate into the RO membrane assembly 138. With the above configuration, boron from seawater supply (as well as brackish water can be reduced significantly to well below recommended levels.

In the first stage 100, the first booster pump 114 was operated at about 6 bar and 15 m$^3$/hr and the first high pressure pump 118 at about 25 bar and 15 m$^3$/hr. The first cartridge filter 114 was a 5μ cartridge filter. The NF membrane assembly 120 included four pressure vessels connected in series with each containing two NF spiral wound membranes of 8"×40". In addition, the NF membrane assembly 120 includes provisions for testing any single NF membrane.

The second stage 130 included the second booster pump 132 operating at 5 bar and 12 m$^3$/hr and the high pressure pump 136 at 82 bar and 12 m$^3$/hr. The second cartridge filter 134 was a 5μ cartridge filter. The RO membrane assembly 138 included three pressure vessels connected in series with each containing two SWRO spiral wound membranes of 8"×40". In addition, two chemical dosing systems were provided for antiscalant and NaOH.

Trial 1

Testing the Performances of Three Different NF Membranes on Removal of Boron

The NF membranes used in this trial have different membrane characteristics in terms of salt rejection and operating feed pressures. The three different NF membranes have been defined as higher rejection (HR), moderate rejection (MR) and lower rejection (LR) NF membranes. Testing the performances of the three different NF membranes were carried out under constant operating conditions for real comparison and accurate results. Constant operating conditions involved seawater feed flow of 8 m$^3$/hr, 15% recovery and feed pH of 7. Seawater feed TDS (total dissolved solids) was in the range of 45,000-46,100 mg/L. In addition, seawater feed temperature was maintained at about 33-34° C. During trial, operation and performance parameters were collected for each type of NF membrane. Chemical analyses were also performed for seawater feed and permeate. Accordingly, the performance of each NF membrane type was determined in terms of feed pressure, flux rate, salt rejection and seawater ions rejection.

In addition to the above, another set of experiments was conducted under the same operating conditions to investigate the effect of increasing feed pH on boron removal. Antiscalant was injected at about 4 ppm, and a NaOH (sodium hydroxide) solution was dosed to increase seawater feed pH as required. The three different NF membranes were operated and tested at different feed pH of 8.5, 9 and 9.5, compared to the natural seawater pH of 8.15. Operation and performance parameters were collected during trial, and also concentrations of boron in seawater feed, and the different NF permeates were determined.

Trial 2

Optimization of NF Seawater Pretreatment at Different Recovery Ratios and Feed pH This trial was carried out to optimize and identify the optimum operating conditions for NF pretreatment alkalization. A single-stage NF process was adopted in seawater pretreatment which included eight HR NF membranes of 8"×40" connected in series. At a later time, the last two HR NF membranes were removed and replaced by two MR NF membrane for better membrane hydraulics. A previous study by the inventor of a similar arrangement suggested an expected recovery for this array as a single NF stage is 65%. In contrast, the NF membrane assembly 120 was operated up to 85% recovery under varying pH conditions to optimize NF membrane boron rejection and identify possible inorganic scaling development on the membrane surface and permeate carrier with increasing both recovery ratio and feed pH. The NF membrane assembly 120 was in operation for about 4,500 hours at ambient temperature of 20-40° C. The seawater feed conductivity ranged from 60,000 to 62,100 μS/cm while feed flow rate was maintained at 8.5±0.1 m$^3$/hr. The seawater was dosed with NaOH to increase seawater feed pH gradually from 8.1 to 9.5 based on requirements for each trial. Antiscalant was injected at a dose rate of about 4 ppm to prevent scale formation. Operation and performance parameters were collected on a daily basis. Concentrations of boron in seawater feed and permeate were determined at various stages of the study. It is of important note that during optimization of the NF membrane alkalization process, NF feed pH did not exceed 9.5 to avoid magnesium hydroxide scaling.

Trial 3

Alkalization of NF-SWRO Configuration in Two Different Operation Modes

Alkalization of NF-SWRO configuration was performed for about 3,800 operating hours in two different operation modes. The first operation mode included only NF membrane alkalization for about 2,200 operating hours. The second operation mode was conducted for 1,600 operating hours to include alkalization of both NF/RO membranes to produce approximately boron free desalinated water as a final adjustment step. In these trials, the NF membrane assembly 120 was operated at constant operating conditions, i.e., 85% recovery and 8.5±0.1 m$^3$/hr seawater feed flow, to maintain constant NF product flow rate of about 7.1 m$^3$/hr as RO feed. Also, when NF process was operating at 65% recovery, seawater feed flow increased to about 11 m$^3$/hr to maintain the same. For the second stage, the SWRO membrane assembly 138 was operated on alkalized NF product under constant operating conditions of 50% recovery and 15.9 L/m2-hr flux rate. Two different antiscalants were injected at NF and RO stages to prevent scaling at a dose rate of about 4 ppm for each.

The three different membranes were evaluated for feed pressure and salt rejection. Operation & performance parameters of three different NF membranes under constant operating conditions are shown in Table 1 as per single membrane performance test. It has been observed that the highest operating pressure was 18 bar for the HR NF membrane, which dropped to 10.5, and 6 bar with MR and LR NF membranes respectively. During the trial, average TDS and conductivity of seawater feed were 45,700 mg/L and 61,900 μS/cm respectively. The HR NF membrane exhibited the lowest permeate TDS and conductivity of 29,510 mg/L and 45,400 μS/cm respectively with a salt rejection of about 35.1%. The LR NF membrane exhibited the highest permeate TDS and conductivity of 37,100 mg/L and 57,200 μS/cm respectively corresponding to an 18.5% salt rejection. The MR NF membrane exhibited a 24.6% salt rejection. The three NF membranes exhibited three different levels of salt rejection, which varied between 18 and 35%. These results had an impact on the permeate chemistry as described below.

TABLE 1

Operation and performance parameters

| Operation & performance parameters | Different NF membranes | | |
|---|---|---|---|
| | High Rejection | Moderate Rejection | Low Rejection |
| Feed pressure bar | 18 | 10.5 | 6 |
| Feed flow m$^3$/hr | 8.01 | 8.03 | 8 |
| Permeate m$^3$/hr | 1.21 | 1.14 | 1.20 |
| Flux L/m$^2$-hr | 37.8 | 35.6 | 37.5 |
| ΔP bar | 0.8 | 0.8 | 0.7 |
| Permeate conductivity μS/cm | 45400 | 52800 | 57200 |
| Permeate TDS | 29510 | 34320 | 37100 |
| Salt rejection % | 35.1 | 24.6 | 18.5 |
| Calcium rejection % | 83.3 | 35.3 | 21.7 |
| Magnesium rejection % | 90 | 60.6 | 28.8 |
| Sulfate rejection % | 99.8 | 98.5 | 91.3 |
| Bicarbonate rejection % | 50 | 21.6 | 9.8 |
| Chloride rejection % | 14.5 | 9.5 | 4.3 |
| Total hardness reduction % | 89.7 | 54.2 | 24.3 |

The three different membranes were also evaluated for seawater ions rejection. The graphs shown in FIGS. 3A-3D reflect the rejection properties of the three different NF membranes as well as the chemical composition of different NF permeates. Five different chemical components were measured for rejection, SO4=, Mg++, Ca++, HCO$_3$— and Cl, and the graphs show the NF membrane selectivity towards different ions. The three different NF membranes showed remarkable sulfate ion rejection ranging from 90.9% to 99.8%. Accordingly, the sulfate ion concentration in NF permeates varied between 6 and 290 mg/L compared to the seawater feed of 3,400 mg/L. Calcium ion rejection ranged from 22% to 83% corresponding to concentrations of 85-400 mg/L in NF permeates. The magnesium ion rejection ranged from 28.8-90% corresponding to concentrations of 155-1,100 mg/L in NF permeates. Consequently, the total hardness as calcium carbonate in NF permeates ranged between 750 and 5,500 mg/L. The bicarbonate rejection ranged from 9.8-50% whereas chloride ion exhibited the lowest rejection level of 4.3-14.5%.

Figure 4A:
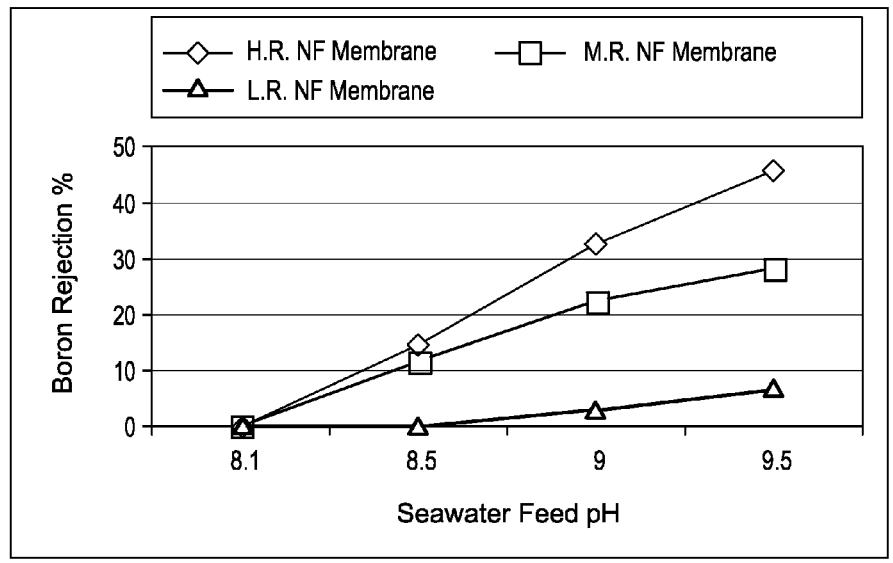
FIG. 4A is a graph showing the boron rejection percentage for each type of NF membrane in FIGS. 3A-3D at various seawater feed pH.
Figure 4B:
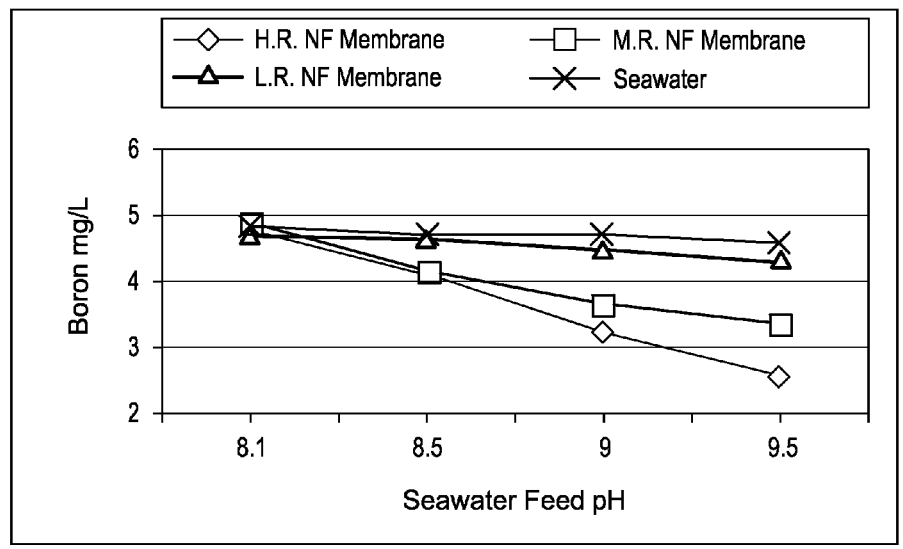
FIG. 4B is a graph showing the corresponding boron concentration of FIG. 4A for each type of NF membrane in FIGS. 3A-3D.
Figure 5A:
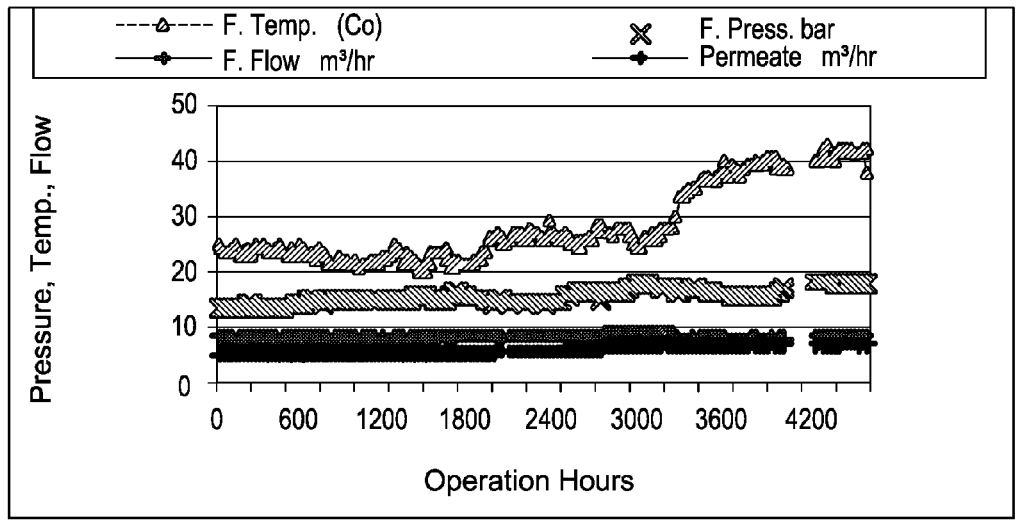
FIG. 5A is a graph showing the operation/performance parameters of an exemplary NF membrane assembly during optimization of NF membrane seawater pretreatment at different recovery ratios and feed pH over an extended test period.
Figure 5B:
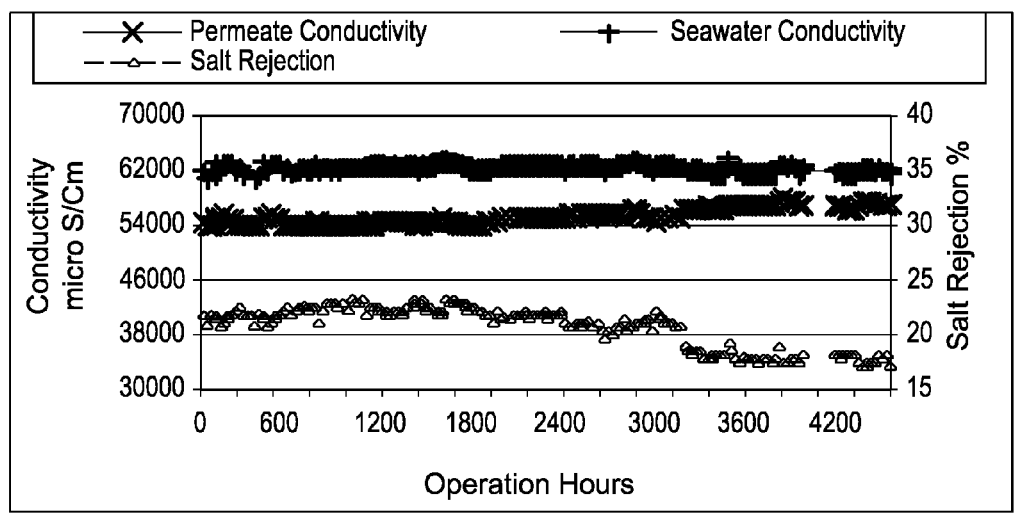
FIG. 5B is a graph showing the salt rejection percentages and other parameters under the time and conditions shown in FIG. 5A.
Figure 5C:
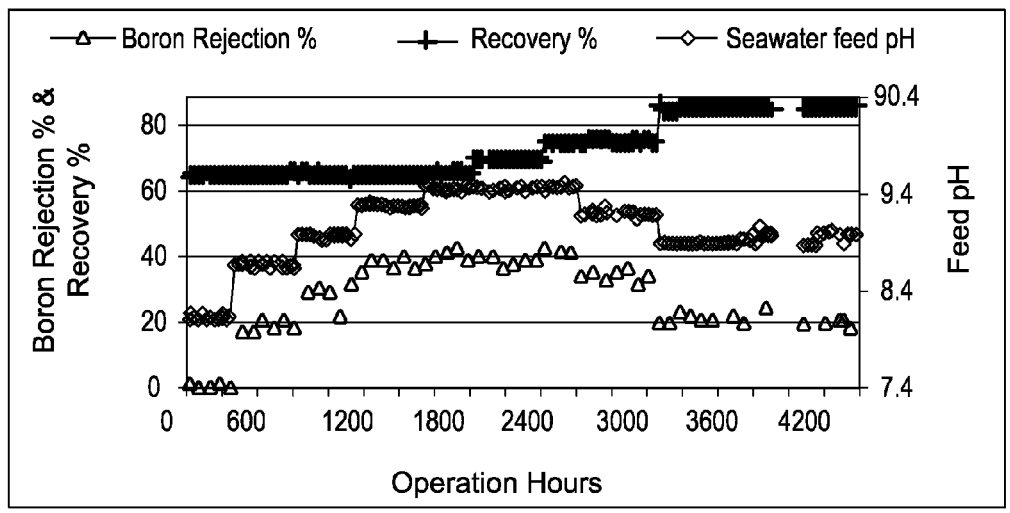
FIG. 5C is a graph showing the boron rejection, recovery and feed pH under the time and conditions shown in FIG. 5A.
Figure 5D:
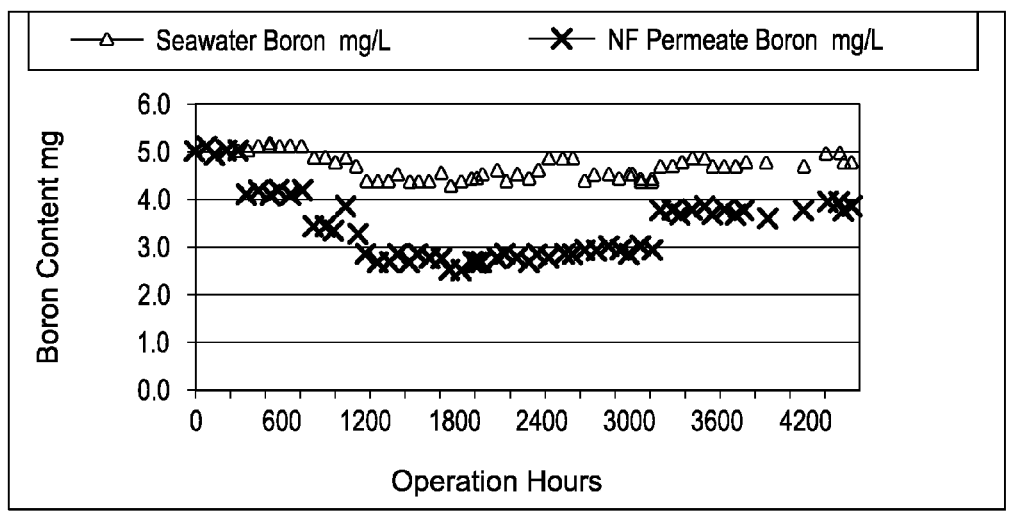
FIG. 5D is a graph showing the corresponding boron content in seawater and NF permeate under the time and conditions shown in FIG. 5A.

The three different membranes were also evaluated for the effect of increasing seawater pH on boron removal. Three different NF membranes were operated under constant operating conditions as mentioned before with injections of NaOH to adjust feed pH to 8.5, 9 and 9.5. Boron concentration in seawater feed during the trial ranged from 4.7 to 5 mg/L. The results shown in FIGS. 4A and 4B indicated that as feed pH was increased, boron rejection increased for both HR and MR NF membranes with the exception of the LR NF membrane which showed insignificant boron rejection. HR NF membrane permeates showed the lowest boron content, which started with 4.75 mg/L at feed pH of 8.15 and reduced gradually to about 2.60 mg/L at feed pH of 9.5 with the highest boron rejection range of 5-46%. The MR NF membrane exhibited a modest boron rejection range of 0.0-29% corresponding to boron concentration range of 4.86-3.25 mg/L in NF permeates. Lastly, the LR NF membrane had the lowest boron rejection values of 3.3% and 6.5% at feed pH of 9 and 9.5 respectively.

It is noted that at natural seawater pH of 8.1, the major species is boric acid in molecular form, which has a relatively small molecular size and no ionic charge. Therefore, the boron rejection at natural seawater pH of 8.1 ranged from zero to 5%. At higher feed pH, boron rejection increased dramatically due to a shift to the charged form B(OH)$_4^-$ that has a relatively larger molecular size and a negative charge. As a result, boron rejection in the HR NF membrane increased to about 46% at pH 9.5. In contrast, the LR NF membrane, which represents loose membrane structure, did not show any significant reduction on boron content even with increasing feed pH up to 9.5. Therefore, LR NF membranes of similar characteristics are not recommended for boron removal. Moreover, these results indicated that the rejection of boron by NF membranes depends mainly on NF membrane polymer structure, i.e., as salt rejection and feed pH were increased, boron rejection increased.

NF membrane seawater pretreatment was operated at different recovery ratios and feed pH to optimize NF membrane boron rejection. The objective aimed at investigating the optimal operating conditions for NF membrane pretreatment alkalization as well as the remedies for any problems encountered during operation. It is known that NF membranes generally have a lower salt rejection characteristic compared to RO membranes of ≥99.8. Thus, when increasing pH, the scaling potential in both concentrate and permeate streams must be closely monitored. More specially, the last NF membranes in the NF membrane to assembly 120 include the highest concentrations of both bicarbonate and calcium ions in NF permeate stream. Since there is no antiscalant at this point, increasing feed pH would lead to formation of CaCO$_3$ scale. Also during optimization of the NF process alkalization, magnesium hydroxide scaling formation was avoided or minimized by ensuring that NF feed pH did not exceed 9.5. Thus, only the potential formation of calcium carbonate scaling became a concern. The concentrate stream is normally controlled by antiscalant. The graphs shown in FIGS. 5A-5D disclose the operation and performance parameters of the NF membrane array 120 for about 4500 hours of operation at different recovery ratios (65%-85%) and feed pH (8.1 to ≤9.5) along with boron rejection. Operation of the NF process at 65% and 85% recoveries represented single- and two-stage NF operations respectively in order to identify possible inorganic scaling development on membrane surface or permeate carrier with increasing both recovery ratio and feed pH.

Initially, the NF process was operated at 65% recovery and natural seawater pH of 8.15 as an initial guideline where NF membrane boron rejection was about 2%. During the 65% recovery test, NF feed pH increased gradually from 8.15 to ≤9.5 resulting in an increased boron rejection gradually from 2% to 44%. At 75% recovery and feed pH ≤9.5, an increase in operating feed pressure accompanied by increasing weight of the last NF membrane was observed. The last NF membrane was removed for autopsy and replaced by a new one. From that point, the NF feed pH was reduced to 9.2 and 8.9 at recovery ratios of 75% and 85% where boron rejection reached about 34% and 20.8% respectively.

Figure 12A:
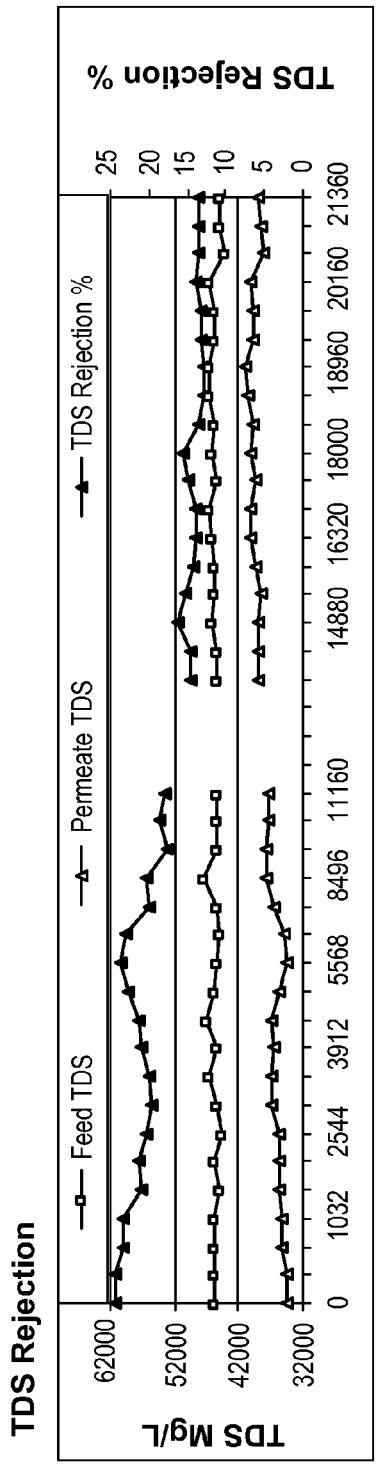
FIGS. 12A and 12B are graphs showing the rejection properties of existing NF membranes over an extended period of operation time.
Figure 12B:
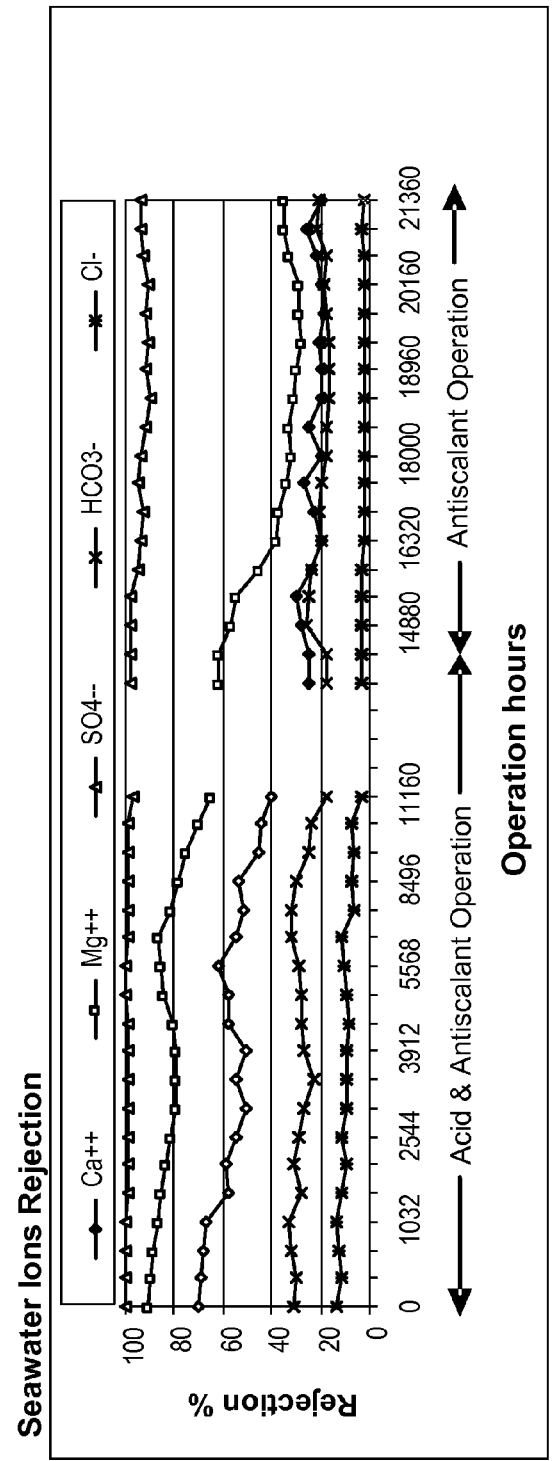

Under the conditions shown in FIGS. 5A and 5B, FIGS. 5C and 5D indicated that concentration of boron in NF permeate varied between 2.6 and 4.1 mg/L compared to seawater feed of 4.5-5 mg/L and that depended mainly on feed pH and product recovery. As feed pH increased, boron removal increased. However, increasing feed pH is limited by the concentration of both HCO$_3^-$ and Ca++ ions in the NF permeate stream, especially those produced from the last two NF elements since they have the highest concentrations. Therefore, both product recovery percentage and NF membrane selectivity towards calcium rejection play an important role in increasing or decreasing feed pH, which reflects directly on boron rejection. The actual overall salt rejection from the NF membrane assembly 120 averaged 22.1% at 65% recovery and decreased to 18% at 85% recovery and that reflects directly on concentrations of both bicarbonate and calcium in the NF stream. NF membrane calcium rejection at 65% and 85% recoveries were 76% and 60% respectively. Accordingly, calcium content in total NF permeate and the last two NF membrane permeate were 120 and 210 mg/L at 65% recovery compared to 200 and 450 at 85% recovery respectively. It is noted that this NF membrane showed a continuous decline in calcium rejection with operation time as indicated in FIGS. 12A and 12B. Of course increasing recovery ratio, feed pH and temperature along with a decline in membrane calcium rejection would lead to formation of calcium carbonate scale. Accordingly, NF process at the beginning of the trial was operated smoothly at 65% recovery and pH<9.5 with maximum boron rejection of 44%, and the boron concentration in NF permeate reached about 2.6 mg/L. With increasing recovery ration up to 85%, the pH decreased to ≤8.9 to obtain smooth operation without scaling. Consequently, boron rejection reached 22%, and the boron concentration in NF permeate was about 3.70 mg/L.

It is noted that boron rejection by this NF membrane assembly at 85% recovery can be improved significantly up to >40% by employing another NF membrane having stable and high calcium rejection to operate at higher feed pH and recovery with remarkable boron rejection. Even with these NF membrane shortcomings, the existing NF membrane can easily achieve the target with the following benefits: (1) ≥22% and 18% reduction in both RO feed boron and TDS respectively with significant reduction in fouling and scaling potential, (2) operating SWRO at very high recovery and flux rate with reduced capital and operational costs, (3) optimizing very efficient RO membrane alkalization up to pH 10 if required with lower caustic consumption resulting in producing boron free desalinated water without a second RO pass and (4) blending with product water of high boron concentration for better economics with no costs.

Figure 6A:
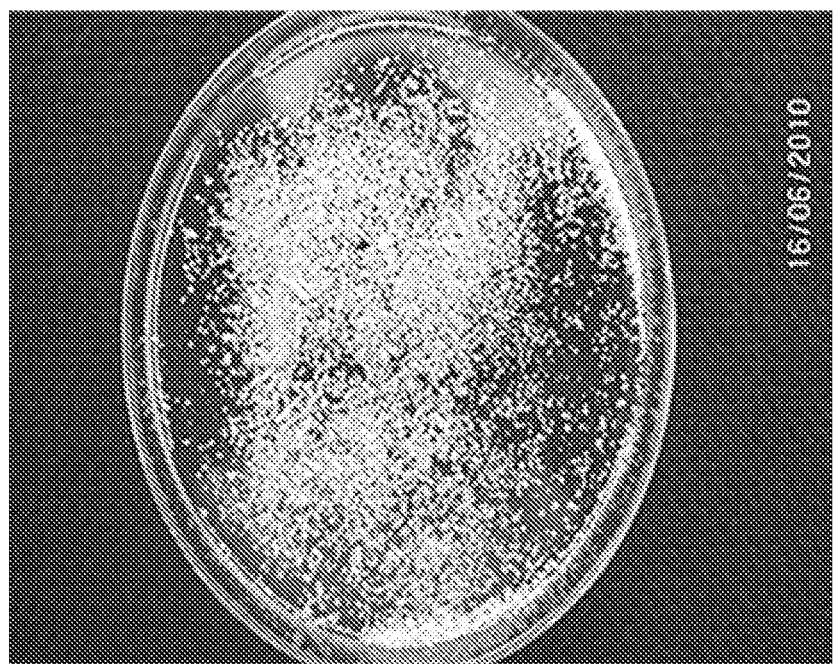
FIG. 6A is a photo of an autopsied NF membrane showing deposits from the permeate tube.
Figure 6B:
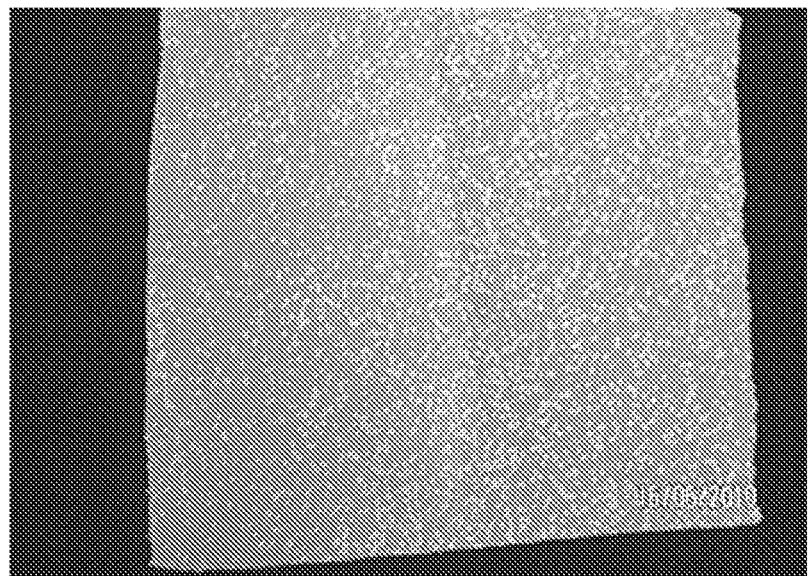
FIG. 6B is a photo of the autopsied NF membrane showing deposits on the permeate carrier.

The last NF membrane was subjected to autopsy and analyses. Visual inspection indicated the presence of white deposits in the permeate tube and permeate carrier as seen in FIGS. 6A and 6B. However, the membrane surface was found to be in very clean conditions. Precipitates deposited inside the permeate tube was collected and analyzed using Scanning Electron Microscope (SEM), Energy Dispersive X-ray (EDX), X-ray Diffraction (XRD) to identify compositions of the white scale.

Figure 6C:
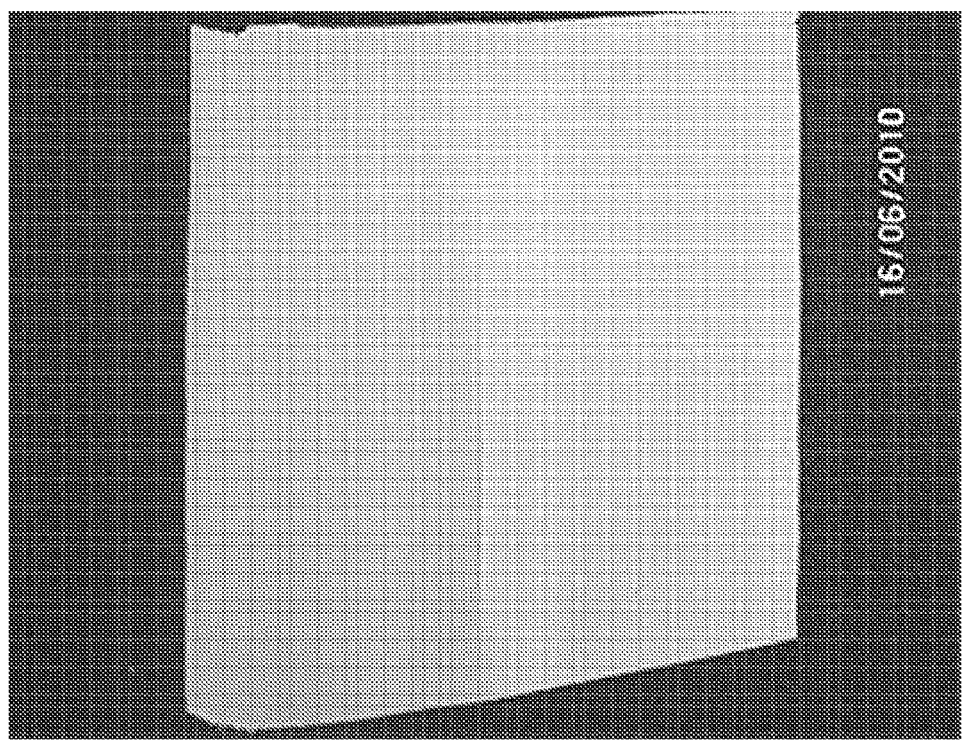
FIG. 6C is a photo of the permeate carrier of FIG. 6B cleaned.
Figure 7:
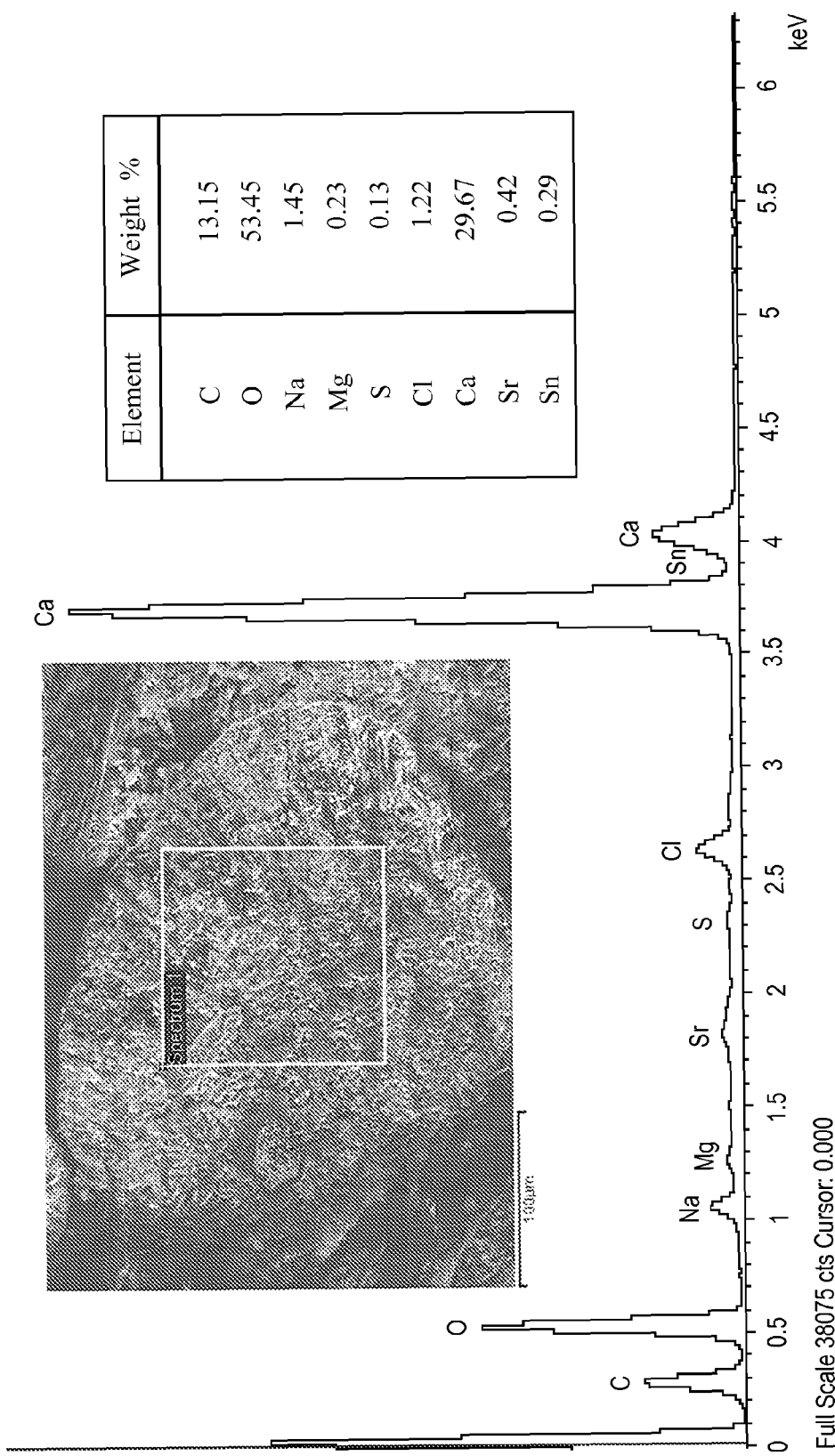
FIG. 7 is an EDX spectrum graph of the precipitate taken from the last NF membrane.
Figure 8:
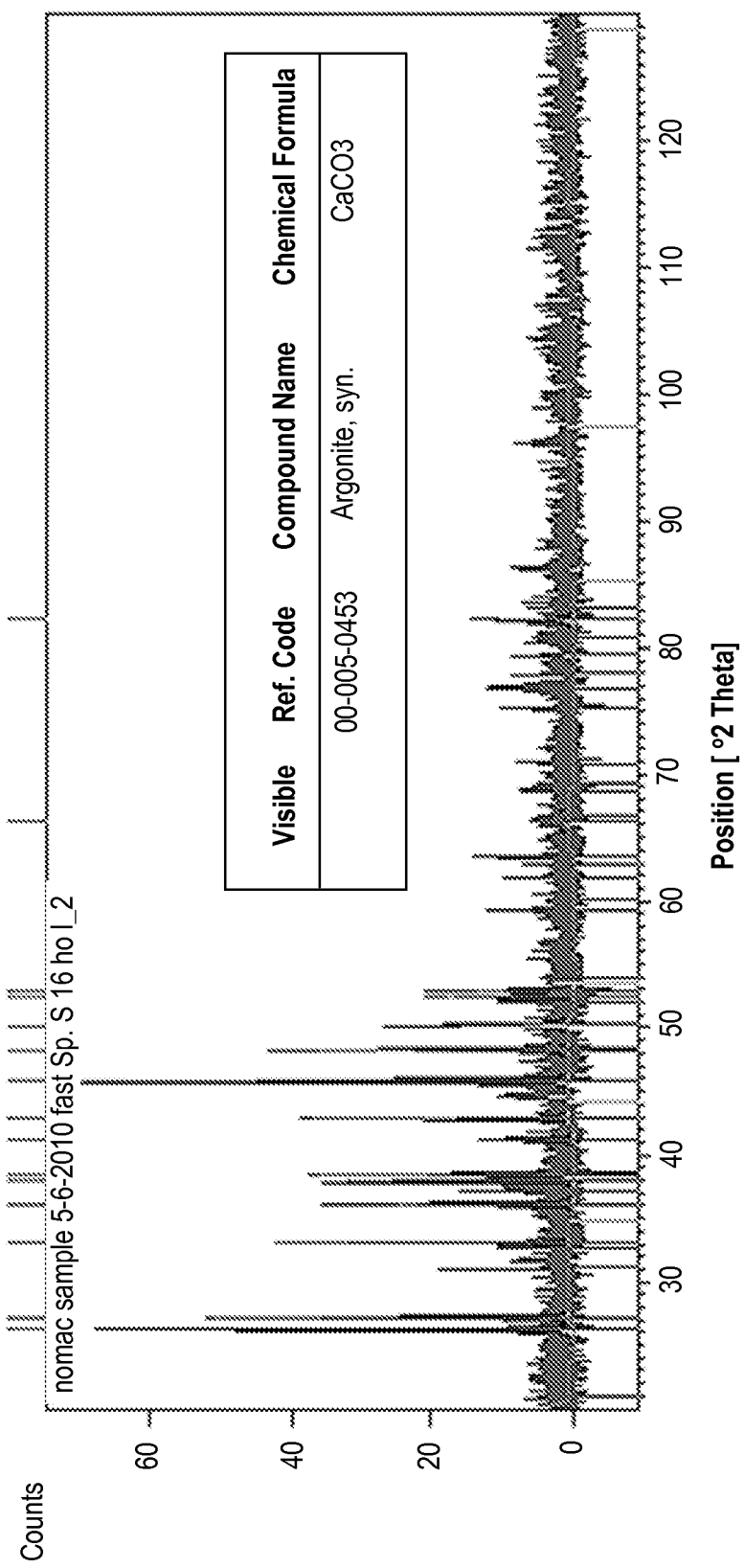
FIG. 8 is an X-ray diffraction (XRD) spectra graph of the precipitate taken from the last NF membrane.

The results from EDX, shown in FIG. 7, revealed strong peaks of carbon, oxygen and calcium. Magnesium showed a weak peak corresponding to very low element percentage weight of 0.23% compared to 29.67% calcium. Another confirmation was drawn from the XRD analysis shown in FIG. 8, which indicated that a major composition of precipitate was aragonite ($CaCO_3$). Based on these results, a piece of the permeate carrier material was exposed to acidic cleaning employing diluted sulfuric acid which was very effective in removing this scale as shown in FIG. 6C. Accordingly, it was concluded that switching NF process from alkaline to acid operation could efficiently remove $CaCO_3$ scale without performing chemical cleaning. Moreover, the analysis of both XRD and EDX confirmed that no sign of magnesium hydroxide scaling was detected because the NF feed pH did not exceed 9.5. This is mainly due to the fact that the presence of the hydroxides begins to occur above pH 9.6.

In addition, although NF concentrate conductivity at 85% recovery increased to 87,100 μS/cm with chemical composition of 25,300 mg/L sulfate ion, 2,080 mg/L calcium ion and 9,100 mg/L magnesium ion, no sings of carbonate or sulfate scaling were observed on the membrane surface. Antiscalant has proven to be effective in controlling both carbonate and sulfate scaling in NF concentrate stream.

Figure 9A:
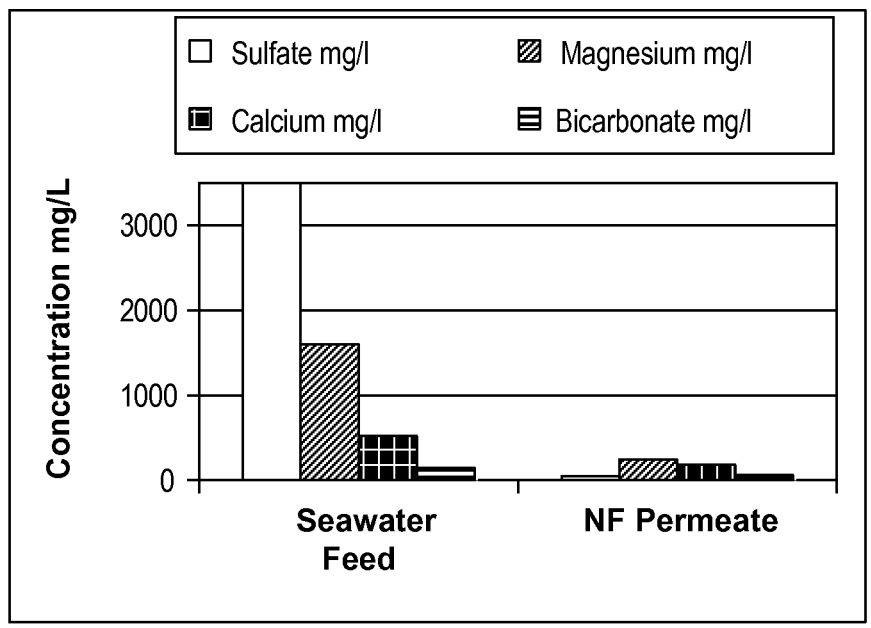
FIGS. 9A, 9B, and 9C are graphs showing concentrations of scale forming ions in both seawater and NF permeate, LSI and SDSI levels for both seawater and NF permeate and their respective concentrates at 50% recovery for an NF-SWRO performance evaluation.
Figure 9B:
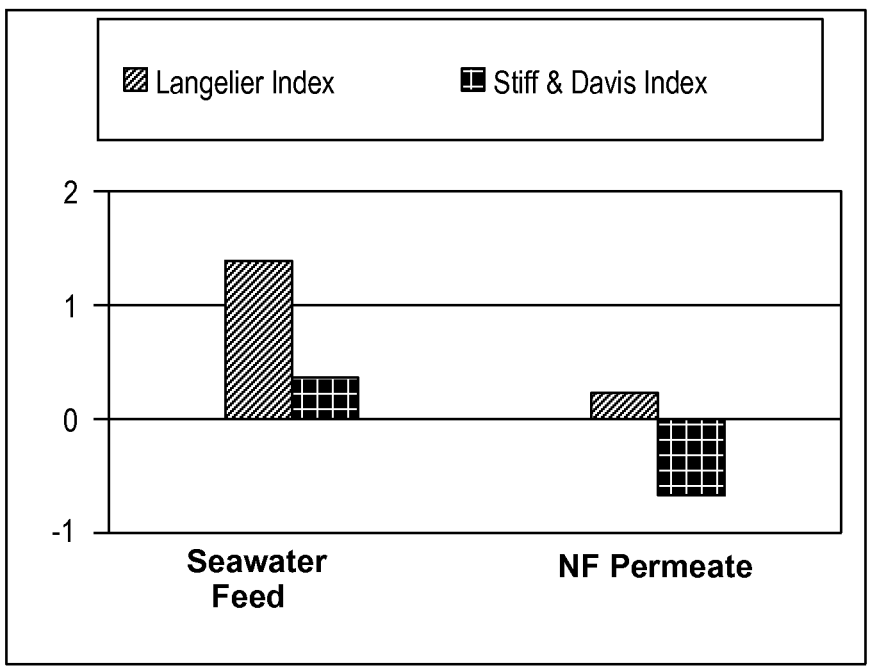
Figure 9C:
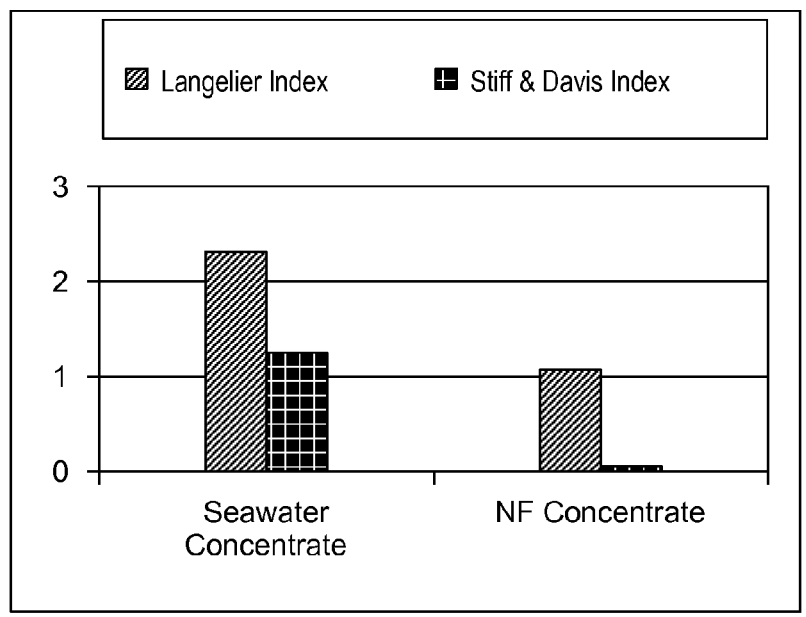

The combination of NF pretreatment with seawater reverse osmosis (SWRO) was then evaluated. A comparison was made between the NF product and seawater feed in terms of scaling and fouling potential. In this trial, SWRO process was performed on alkalized NF product as superior RO feed, since NF permeate has lower scaling and fouling potential. Accordingly, the advantages of NF permeate over seawater were investigated in relation to high flux rate, recovery and high pH operation to determine compliance with the above mentioned boron regulation with reduced caustic consumption. During the test period, the NF permeate SDI was found to be ≤1. FIGS. 9A-9C show concentrations of scale forming ions and scaling potential (LSI and SDSI) for seawater (45,680 mg/L TDS, pH 8.1) and NF permeate (36,540 mg/L TDS, pH 7.9) along with LSI & SDSI levels for their respective concentrates at 50% recovery.

Figure 10:
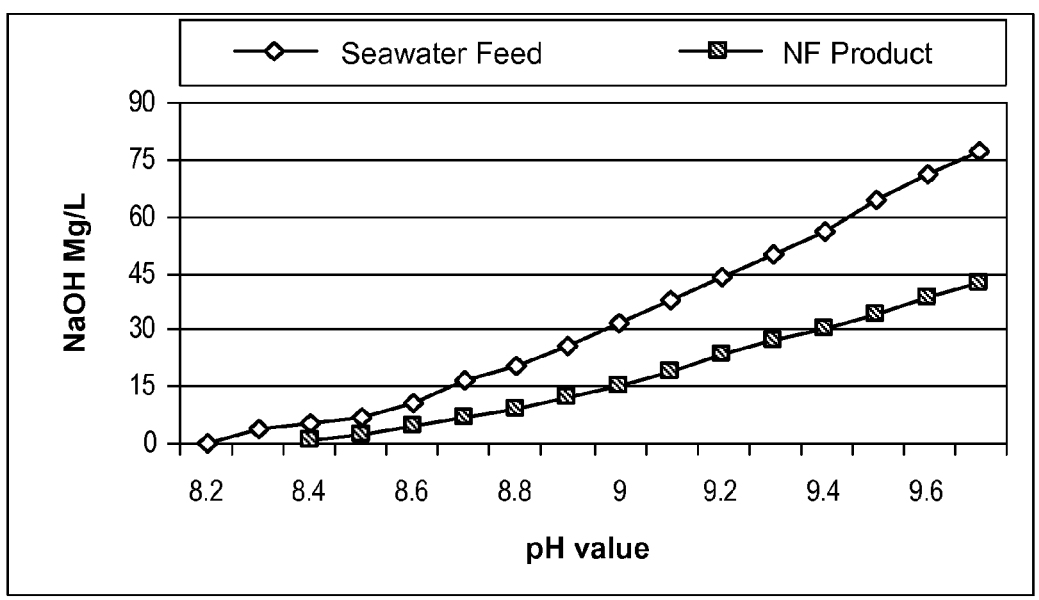
FIG. 10 is a graph showing the caustic consumption rate for both seawater feed and NF product at different pH values for the NF-SWRO performance evaluation.

Concentrations of scale forming ions (SO4-, HCO3-, Ca++, Mg++) in seawater were 3,350, 150, 510 and 1,610 mg/L compared to the NF product of 50, 60, 180 & 250 mg/L respectively and that reflects directly on their scaling potential as shown in FIGS. 9A-9C. The NF product showed a significant decrease in LSI & SDSI levels, which were 0.37 and −0.67, compared to seawater of 1.39 and 0.37 respectively. The NF concentrate also exhibited a significant decrease in LSI and SDSI values, which reached about 1.07 and 0.06, compared to seawater concentrate of 2.31 and 1.27. Accordingly, increasing seawater feed pH for higher boron rejection would result in a sharp increase in LSI value up to 3 or more, and that is outside the efficacy parameters of existing antiscalants, which are recommended for LSI levels of up to 1.8 as a matter of conservative design. For this reason, antiscalant suppliers are trying to produce new antiscalants for higher pH operation, e.g., 9.5-10. Moreover, seawater with this chemical composition having strong buffering action will require increased caustic consumption due to the presence of high concentration of bicarbonate ions. In contrast, the NF product exhibited much lower LSI and SDSI levels, and therefore can tolerate the existing antiscalants while maintaining high feed pH with reduced caustic consumption. FIG. 10 shows the caustic consumption rate for both seawater feed and NF product at different pH values. NF product exhibited the lowest caustic consumption rate compared to seawater feed. These results confirmed that NF permeate showed negligible fouling and scaling potential compared to seawater feed and that would lead to (1) improved performance of conventional SWRO process when operating at very high recovery and flux rate with reduced desalinated water cost and (2) optimized very efficient RO membrane alkalization up to pH 10 if required with reduced caustic consumption resulting in producing nearly boron free desalinated water without a second RO pass or additional costs.

Figure 11A:
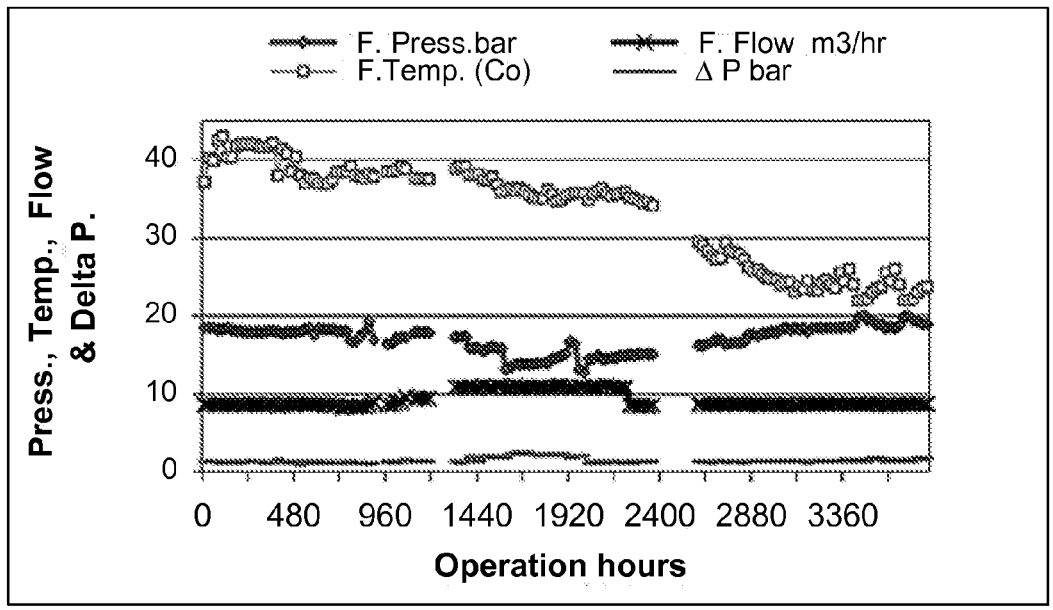
FIGS. 11A and 11B are graphs showing stable NF membrane performance in relation to product flow rate and product recovery for the NF-SWRO performance evaluation.
Figure 11B:
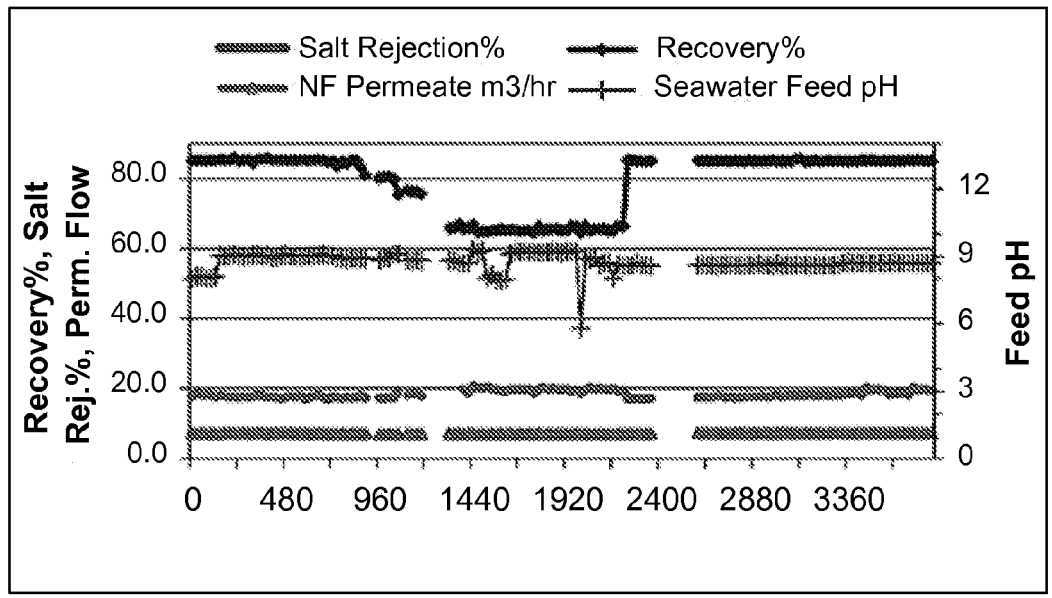

An evaluation of the operation and alkalization of the NF process as RO feed was made. In this test, the NF membrane assembly 120 employed eight NF membranes of 35% salt reduction and operated for about 2,200 hours. After about 1,584 operating hours, the last two NF membranes were replaced by two NF membranes of 25% salt reduction in accordance with the latest approach called internally staged membrane design for better membrane hydraulics. NF operation performed at 65% and 85% recoveries, which represented single and two-stage NF operations. The two different operation modes produced a constant NF product flow rate of 7.1±0.1 m$^3$/hr as RO feed. NF operation commenced with 85% recovery (seawater feed flow: 8.5±0.1 m$^3$/hr, feed pH: 8.8-9). Operation at 65% recovery was performed at feed pH of 9.2 and seawater feed flow rate of 10.9±0.1 m$^3$/hr. Seawater feed conductivity ranged from 60,000 to 62,100 μS/cm. During this trial, the NF product conductivity averaged 54,600 and 56,300 µS/cm at 65% and 85% recoveries corresponding to overall salt rejection of 19.9 and 17.7% respectively. In addition, the operating feed pressure varied between 13 to 18.5 bar, depending on variations in both feed temperature from 37 to 42° C. and recovery from 65 to 85%. The differential pressure across membranes at 85% recovery was steady at about 1.2-1.4 bar and increased to 2.2 bar at 65% recovery due to increasing feed flow form 8.5 to 10.9 m³/hr to maintain necessary RO feed flow. Stable NF membrane performance was obtained in relation to product flow rate and product recovery as shown in FIGS. 11A and 11B.

During a run of about 1,680 operating hours at 65% recovery and feed pH 9.2, a gradual increase in operating feed pressure up to 16.7 bar along with a decrease in permeate flow at the last pair of NF membranes was observed indicating formation of $CaCO_3$ scale. Accordingly, NF process was switched from alkaline to acid operation at pH 5.8 under the same operating conditions without performing a chemical clean. This procedure succeeded in restoring permeate flow rate of the last pair and lowered feed pressure from 16.7 to 14 bar within two hours. It is noted that NF membrane alkalization at 65% recovery and feed pH≤9.5 during optimization of the NF process at different recovery ratios was performed smoothly without similar formation of $CaCO_3$. The main reason for this problem can be attributed to a continuous decline in calcium rejection during operation time, which is highlighted by a decreased calcium rejection of 55% from the initial value of 80% during the first 48 hours of operation. This behavior was not unexpected from this type of NF membrane as shown in FIGS. 12A and 12B. Moreover, the test period extended through the summer months, during which time the seawater feed temperature increased to about 41° C. due to heat from the season and from inputs by the first high pressure pump 18. Higher seawater feed temperature has negative effects on NF membrane rejection properties, especially with the calcium content.

Figure 13A:
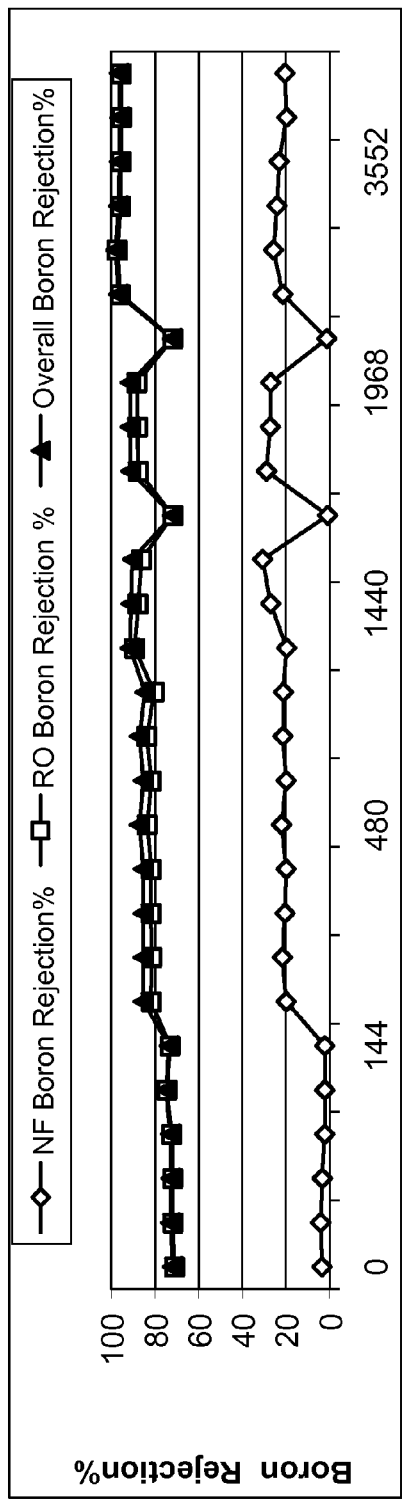
FIGS. 13A and 13B are graphs showing the boron rejection properties of NF and RO membranes under varying pH conditions over an extended period of time for the NF-SWRO performance evaluation.
Figure 13B:
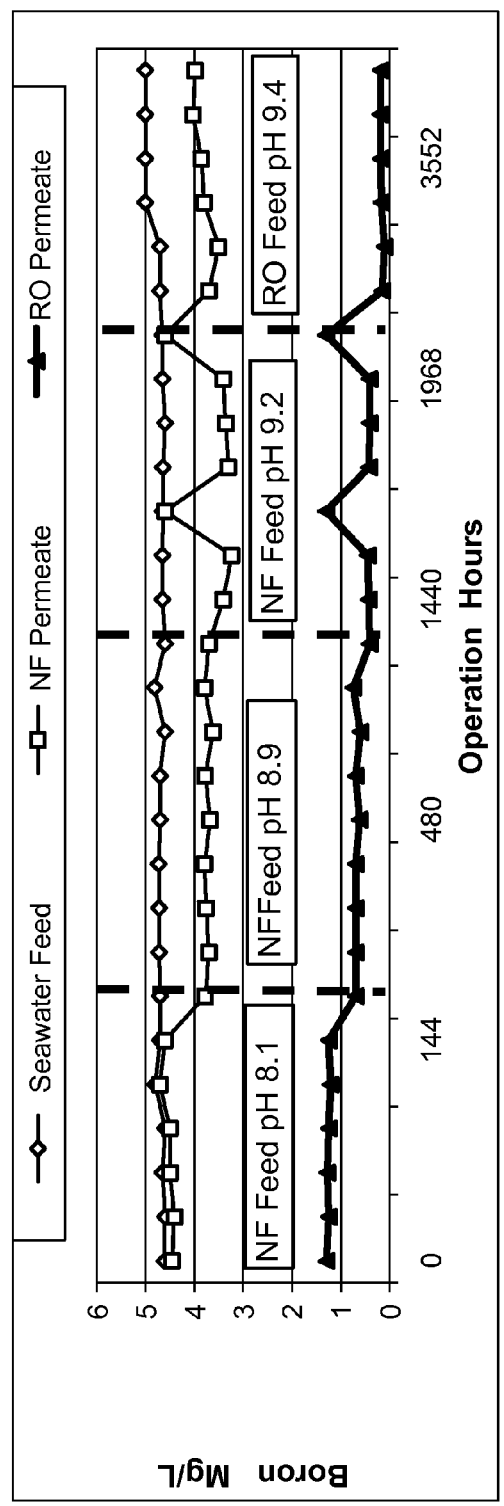

However, as mentioned previously, NF membrane boron rejection depended mainly on feed pH and recovery ratio. The first 120 operating hours were performed without injecting NaOH at NF/RO stages to investigate the actual boron rejection for both NF and RO membranes to provide a baseline guide line. At 85% recovery and natural seawater feed pH of 8.15, NF membrane boron rejection was 2-4%. With increasing feed pH up to 8.9, boron rejection increased to 22.3% and the corresponding boron concentration in NF permeate averaged 3.65 mg/L compared to the seawater feed of 4.7 mg/L. At 65% recovery and feed pH 9.2, boron rejection reached 27-30%, and the corresponding boron concentration in NF permeate averaged 3.3 mg/L. FIGS. 13A and 13B show NF membrane boron rejection under varying pH conditions and also boron content for both seawater feed and NF permeate for about 3,800 operating hours. The results of existing trial are in conformity with the results of NF process optimization at different recovery ratios and feed pH in relation to feed pH and boron rejection. Although the tested NF membrane showed a continuous decline in calcium rejection, NF membrane pretreatment alkalization can be optimized successfully at 85% recovery and feed pH 8.9 with boron rejection of ≥22%. It is noted that calcium concentration in the NF permeate stream, especially in the last pair of NF membranes, can be a limiting factor in NF seawater pretreatment alkalization. Based upon this finding, it is preferable and recommended to us a stable and high calcium rejection NF membrane for operation at higher recovery and feed pH with exceptional boron rejection. Alternatively, the high boron rejection can be accomplished with a 22% boron rejection at NF stage and utilizing the NF product for a subsequent, efficient RO membrane alkalization as a final adjustment step for extreme boron regulation.

Figure 11C:
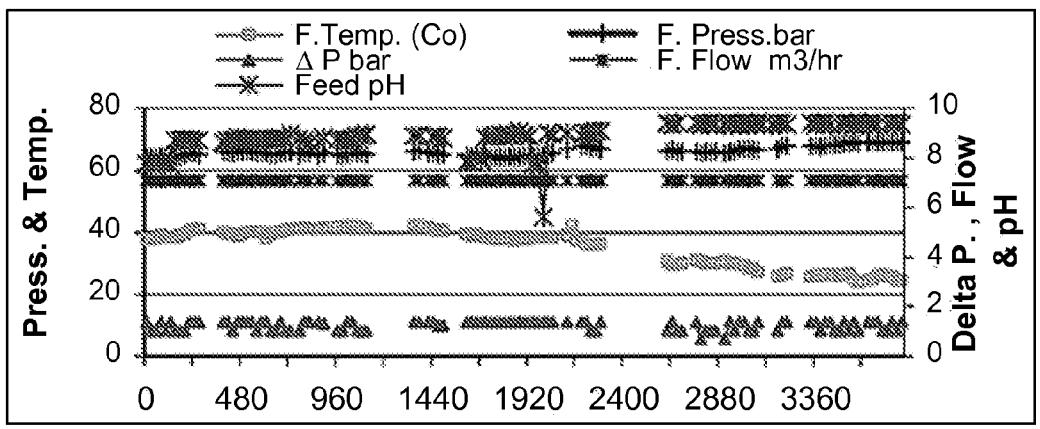
FIGS. 11C, 11D and 11E are graphs showing the operation and performance parameters of the NF-SWRO performance evaluation.
Figure 11D:
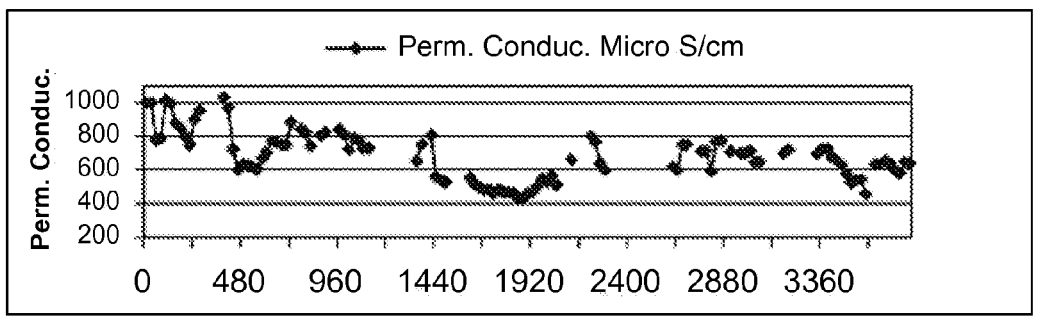
Figure 11E:
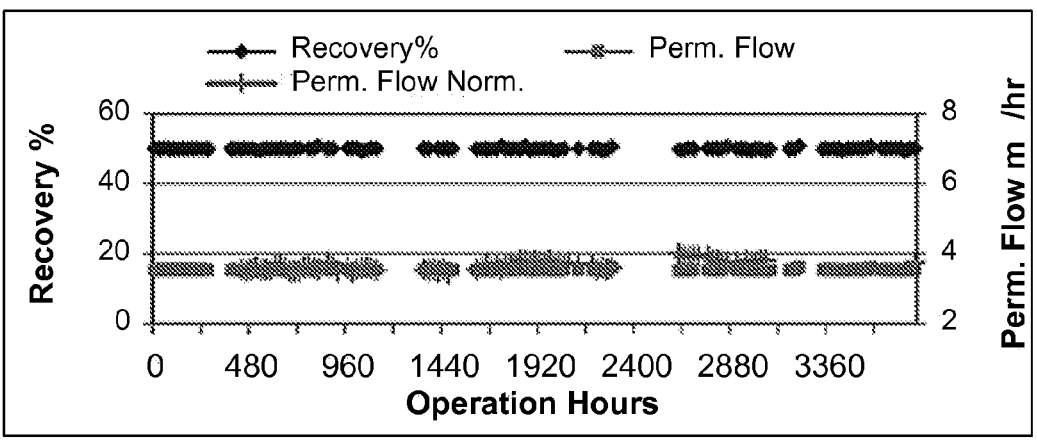

A performance evaluation of the SWRO process on the alkalized NF product was made for a run of about 3,800 operating hours. A single-stage SWRO process was adopted in this trial. The RO membrane assembly 138 included six SWRO elements of 8"×40" connected in series (4 higher rejection membranes followed by 2 lower rejection membranes). The typical boron rejection of the existing SWRO membranes at nominal test conditions ranged from 90 to 93%. The RO membrane assembly 138 processed alkalized NF product in two different operation modes, one with and the other without RO membrane alkalization. The first 2,200 operating hours were dedicated to the first operation mode where alkalization process was carried out only at NF stage up to pH 9.2. The remaining 1600 operating hours represented the second operation mode where NF and RO membrane alkalization was carried out at pH 9 and pH 9.4 respectively. Additional investigations can be me for RO membrane alkalization at pH 9.5 or more. FIGS. 11C-11E show the operation and performance parameters of the SWRO process during this period of 3800 hours. These graphs show stable RO membrane performance in relation to product flow rate, product recovery and permeate conductivity for the NF-SWRO. The results proved favorable showing of extreme boron rejection. The SWRO operation was performed under extreme operating conditions, i.e., 50% recovery, 15.9 L/m2-hr flux rate, with NF permeate feed flow rate of 7±0.1 m³/hr. Moreover, the summer heat caused the NF permeate temperature to rise in the range of 37 to 41° C. due to heat inputs of both NF and RO high pressure pumps, i.e., the first and second high pressure pumps 18 and 36. It is noted that the RO membranes used in the trial were designed to operate up to 45° C. However, some plastic materials of the RO membrane exhibited plastic creep during operation even though the maximum RO feed temperature did not exceed 42° C., and the RO operation was performed in accordance with the temperature-pressure limitations. The actual operation of the SWRO process under such higher feed temperatures was a great opportunity to investigate how well the challenges of boron rejection can be met. During the test period, NF permeate conductivity ranged from 54,600 to 56,310 µS/cm based on NF process recovery ratio. The RO feed pH varied between 8.6 and 9.4 depending on injection of NaOH as required at NF stage and RO stage. During trial, operating feed pressure ranged from 62.8 to 65.5 bar, and the differential pressure across RO membranes was 1.0-1.3 bar. The normal RO permeate flow averaged 3.5 m³/hr at 50% recovery. The normalized RO permeate flow trend shown in FIG. 11E indicated that no scale development occurred during the 3,800 operating hours. In addition, the RO permeate conductivity reached about 1,000 µS/cm due to the RO membrane assembly 138 employing a pair of lower rejection RO membranes. After about 408 operating hours, the pair of lower rejection RO membranes were removed and replaced by a pair of higher rejection RO membranes. As a consequence, the RO permeate conductivity decreased to a range of 500-800 µS/cm.

FIGS. 13A and 13B show the rejection properties of NF and RO membranes with respect to boron removal under varying pH conditions for about 3,8200 operating hours. The first 120 operating hours was conducted without injecting NaOH at NF and RO stages to investigate the actual RO membrane boron rejection, which was 73% at natural seawater feed pH of 8.15. This was repeated after about 1,608 operating hours confirming the same. The corresponding boron concentration in RO permeate without injecting NaOH was 1.3 mg/L. Alkalization of NF process at feed pH 8.8-9.0 and 85% recovery resulted in a reduction in seawater feed boron content from 4.7 to 3.65 mg/L with 22.3% boron rejection, whereas concentration of boron in RO permeate was 0.6 mg/L. The average overall boron rejection was about 86%. The NF membrane alkalization at 65% recovery and feed pH 9.2 led to additional reduction in both NF and RO permeates which reached about 3.3 and 0.4 mg/L respectively corresponding to average overall boron rejection of 91.5%.

The NF-SWRO configuration is highly flexible with respect to system operation. The various NF and RO membranes can be interchanged with other grades, and the feed pressure, pH levels, antiscalants and other chemical and thermal elements can be modified or adjusted as desired. To maximize overall boron rejection up to 100%, one can employ another NF membrane having stable and high calcium rejection to alkalize the NF process at higher feed pH with exceptional boron rejection of >70%. Another option can be the alkalization of the RO membrane as a final adjustment step by utilizing the alkalized NF product at the RO stage for severe boron regulation. The second option has been conducted for about 1,600 operating hours at RO feed pH 9.4. The overall boron rejection was in the range of 96-98%, and the corresponding boron concentration in RO permeate ranged from 0.1-0.15 mg/L. The previous results confirmed that any slight increase in RO feed pH up to pH 9.5 can easily produce nearly boron free desalinated water.

Based on these encouraging results, another test will be conducted at RO feed pH of 9.5 or more after maintenance to produce approximately boron free desalinated water. This is mainly due to employing the advantages of alkalized NF product, which has a lower scaling potential, that led to increasing RO feed pH range up to 10 if required with reduced caustic consumption while maximizing RO membrane boron rejection up to nearly 100%. In addition, the near boron-free product water can be blended with product water of high boron concentration for additional reduction in operation and capital costs. As a result, this process can overcome many challenges compared to currently applied techniques such as high feed temperature, high levels of feed boron, unexpected deterioration of the membrane boron rejection, high flux rate and recovery, etc.

As the above results show, the NF membrane alkalization greatly improves seawater pretreatment by reducing fouling potential SDI<1, reducing scaling potential (LSI &SDSI levels) by about 60-70%, and exhibiting both 20-30% salt rejection and 30-50% boron rejection. The SWRO process can be operated at very high recovery ≥55% and flux rate 16-18 $Lm^2/hr$ with reduced water production cost compared to conventional process of 35-40% recovery and 13 $Lm^2/hr$ flux rate. The very efficient RO membrane alkalization can be optimized up to pH 10 if required with significant reduction in caustic consumption (based on alkalized NF product properties) while producing nearly boron free desalinated water with 99% boron rejection and without a second RO pass as commonly practiced. Moreover, severe boron regulation can be easily optimized by blending the produced RO permeate of approximately zero boron concentration with product water of high boron concentration to reach the recommended level of ≤0.4 mg/L without any additional cost.

It is to be understood that the present invention is not limited to the embodiments described above, but encompasses any and all embodiments within the scope of the following claims.

I claim:

1. A method of removing boron from saline water, comprising the steps of:
    providing a saline water pretreatment stage having a nanofiltration (NF) membrane assembly;
    feeding a first amount of seawater having a given boron concentration to the NF membrane assembly at a predetermined pressure and flow rate;
    increasing the pH of the fed seawater from natural seawater pH to a pH value ranging between 8.5 and 10 in order to alkalize the NF membrane assembly;
    passing the saline water through the NF membrane assembly to produce NF permeate having a boron concentration less than about 0.4 mg/l;
    feeding the NF permeate for further processing at a predetermined recovery ratio, the NF permeate having a pH ranging from 8.5 to 10;
    providing a second treatment stage having a reverse osmosis (RO) membrane assembly;
    feeding the NF permeate to the RO membrane assembly at a predetermined pressure and flow rate;
    passing the NF permeate through the RO membrane assembly to produce desalinated water having a boron concentration less than about 0.2 mg/l;
    feeding a second amount of seawater to another RO membrane assembly at a predetermined pressure and flow rate to produce RO permeate having a boron concentration of about 1 mg/L;
    blending the desalinated water having a boron concentration less than about 0.2 mg/L with the RO permeate having a boron concentration of about 1 mg/L to produce desalinated water having a boron concentration less than about 0.4 mg/L.

2. The method of removing boron from saline water according to claim 1, wherein said recovery ratio ranges from 65% to 85%.

3. The method of removing boron from saline water according to claim 1, wherein feeding a first amount of seawater further comprises:
    feeding the seawater to a first booster pump for pumping seawater to the NF membrane assembly at said predetermined pressure and flow rate;
    pumping the seawater through a first cartridge filter disposed in-line with the first booster pump for initial filtration of the seawater; and
    feeding the seawater from the first cartridge filter to a first high pressure pump in-line with the first filter cartridge; and
    pumping the seawater from the first high pressure pump to said NF membrane assembly.

4. The method of removing boron from saline water according to claim 3, wherein said NF membrane assembly comprises a plurality of NF membranes disposed in pairs in series downstream of said first high pressure pump, said NF membrane assembly having a predetermined overall salt rejection of at least 18% and boron rejection of at least 22%.

5. The method of removing boron from saline water according to claim 4, wherein at least one of said NF membranes includes stable and high calcium rejection characteristics.

6. The method of removing boron from saline water according to claim 1, wherein the step of increasing the pH of the fed seawater comprises increasing the pH of the feed water to a level ranging between 8.8 and 9.2.

7. The method of removing boron from saline water according to claim 6, wherein the step of increasing pH of the feed water comprises the step of dosing said feed water with a predetermined amount of caustic chemical.

8. The method of removing boron from saline water according to claim 1, further comprising the step of maintaining feed pH at or below 9.5 in order to prevent magnesium hydroxide scale formation.

\* \* \* \* \*